United States Patent
Welch et al.

(10) Patent No.: US 6,942,263 B2
(45) Date of Patent: Sep. 13, 2005

(54) MOUNT FOR TRUCK MOUNTED ATTENUATOR

(75) Inventors: James B. Welch, Placerville, CA (US); Doug E. Wilkinson, Auburn, CA (US)

(73) Assignee: Energy Absorption Systems, Inc., Chicago, IL (US)

( * ) Notice: Subject to any disclaimer, the term of this patent is extended or adjusted under 35 U.S.C. 154(b) by 0 days.

(21) Appl. No.: 10/821,404

(22) Filed: Apr. 9, 2004

(65) Prior Publication Data

US 2004/0251698 A1 Dec. 16, 2004

Related U.S. Application Data

(60) Provisional application No. 60/464,072, filed on Apr. 17, 2003.

(51) Int. Cl.[7] .............................................. B60R 19/34
(52) U.S. Cl. ...................... 293/133; 293/132; 256/13.1; 188/377; 404/10
(58) Field of Search .............................. 293/116, 118, 293/119, 132, 133; 188/377; 256/13.1; 404/10

(56) References Cited

U.S. PATENT DOCUMENTS

| | | | |
|---|---|---|---|
| 5,199,755 A | | 4/1993 | Gertz |
| 5,248,129 A | * | 9/1993 | Gertz ........................ 293/133 |
| 5,642,792 A | | 7/1997 | June |
| 5,697,657 A | * | 12/1997 | Unrath, Sr. ................ 293/118 |
| 5,947,452 A | * | 9/1999 | Albritton ................... 293/133 |
| 6,092,959 A | | 7/2000 | Leonhardt et al. |
| 6,244,637 B1 | | 6/2001 | Leonhardt et al. |
| 6,481,920 B1 | | 11/2002 | Leonhardt et al. |
| 6,523,872 B2 | * | 2/2003 | Breed ........................ 293/132 |
| 6,579,034 B1 | * | 6/2003 | Welch et al. ................ 404/6 |
| 2003/0077119 A1 | * | 4/2003 | Leonhardt et al. ............. 404/6 |

OTHER PUBLICATIONS

Copy of "TMA Attachment Standards," Energy Absorption Systems, Inc., dated Apr. 1, 2003, one page.
Copy of brochure, "Traffix Scorpion Truck Mounted Attenuator," TraFix Devices, pp. 1–24, date unknown.

* cited by examiner

Primary Examiner—Lori L. Coletta
(74) Attorney, Agent, or Firm—Brinks Hofer Gilson & Lione

(57) ABSTRACT

A truck mounted attenuator includes an interface structure comprising a pivot mount at a first location and a bearing surface at a second location vertically spaced from the first location. The pivot mount is adapted to be pivotally mounted to a pivotable truck component and the bearing surface is adapted to slidably engage an understructure of the truck. A backup structure is pivotally mounted to the interface structure at a third location and is engaged with the interface structure at a fourth location spaced from the third location. A crash cushion is supported at least in part by said backup structure. This crash cushion can be implemented as described in detail below to provide carefully tailored decelerating loads on the impacting vehicle. In other aspects, a truck outfitted with an impact attenuator and a method for mounting a truck mounted attenuator on a truck are also provided.

35 Claims, 17 Drawing Sheets

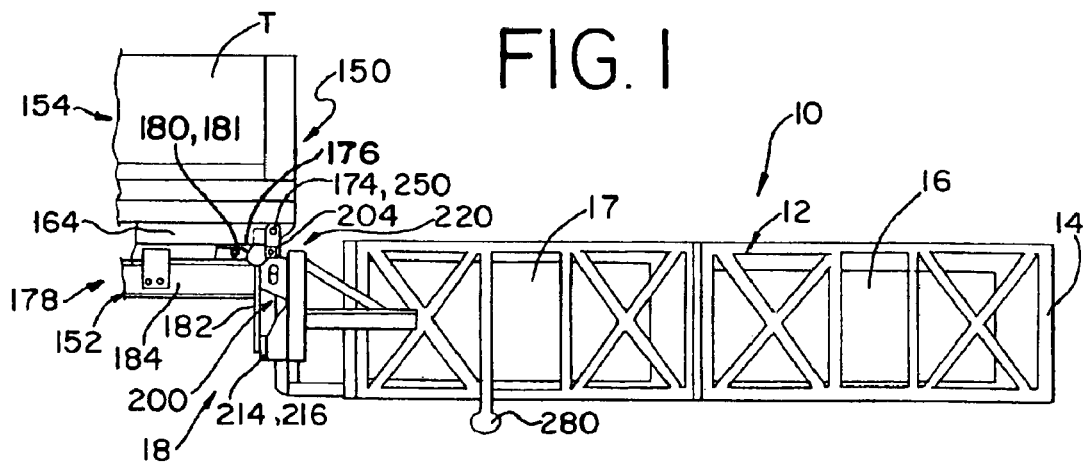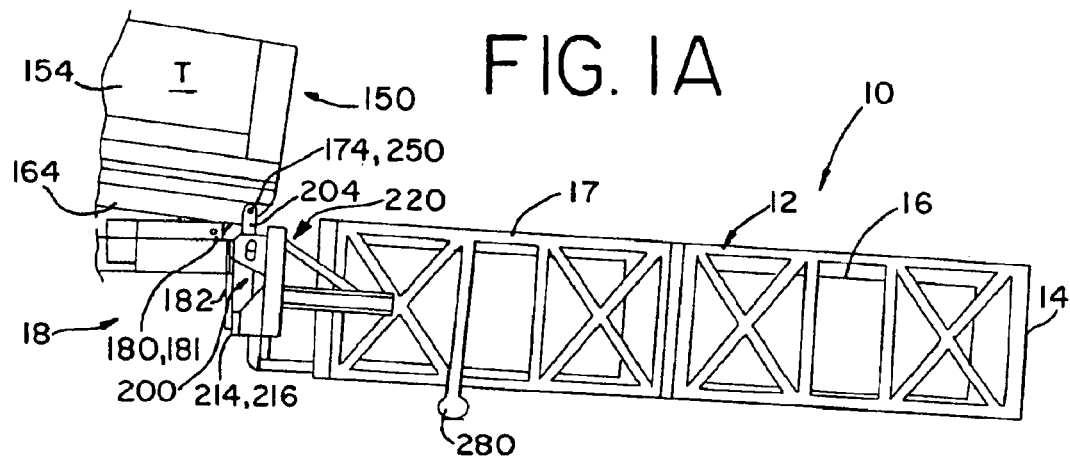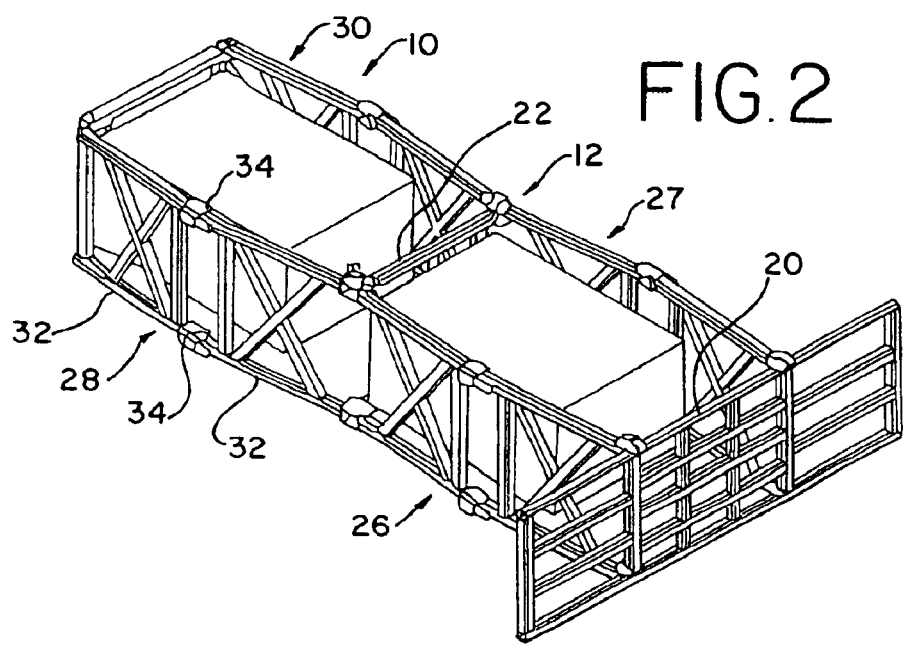

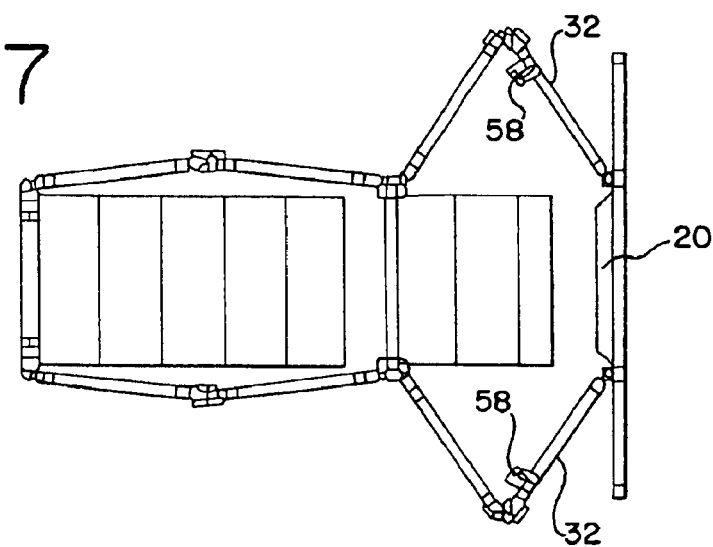
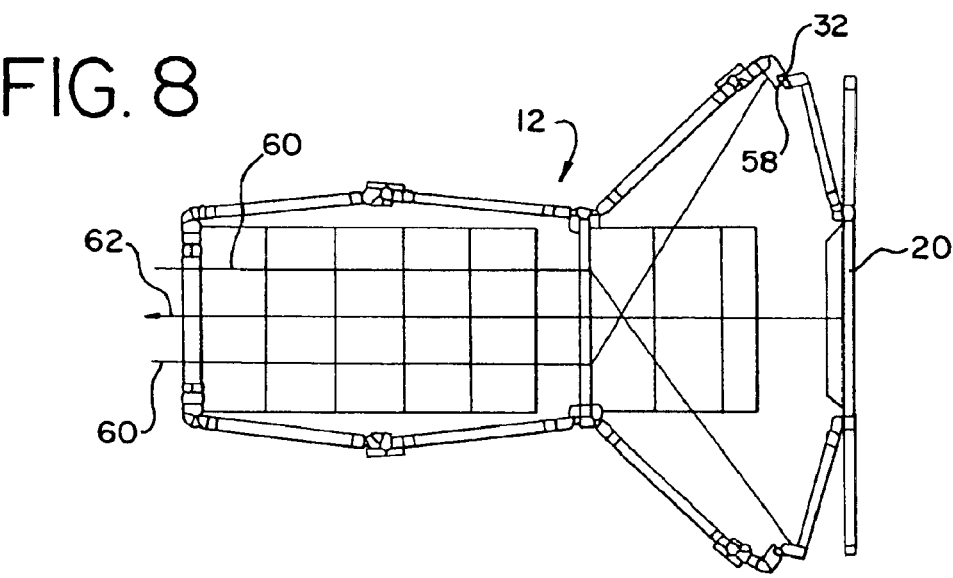
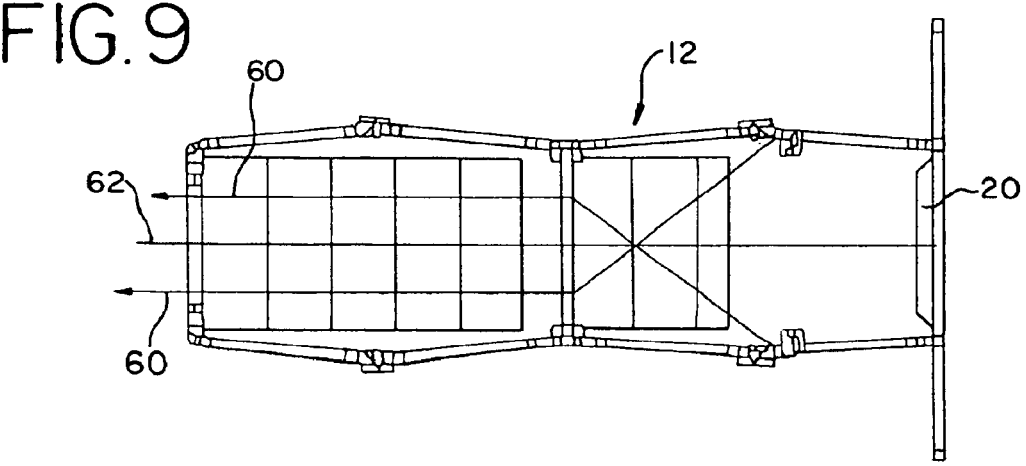

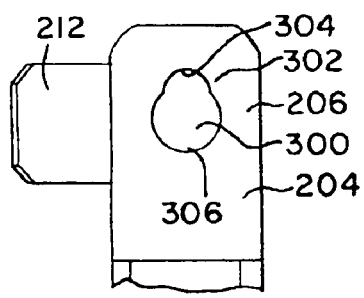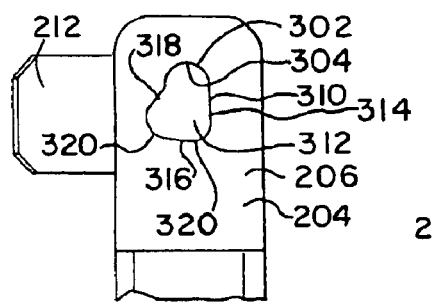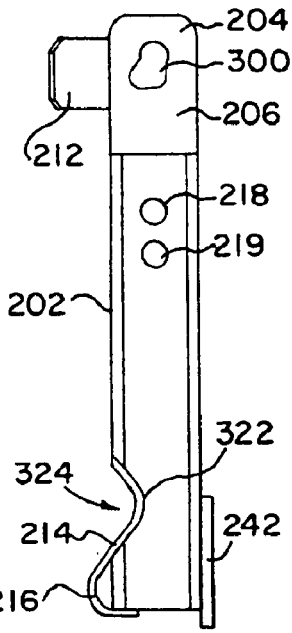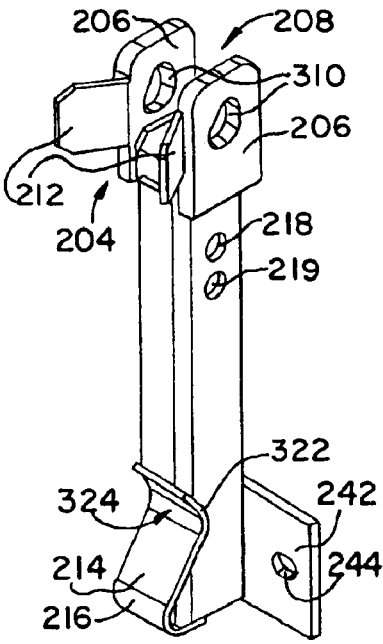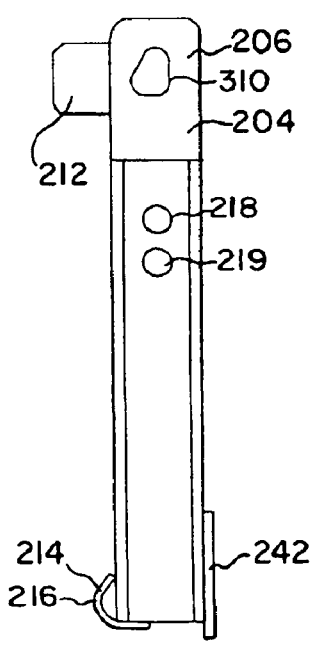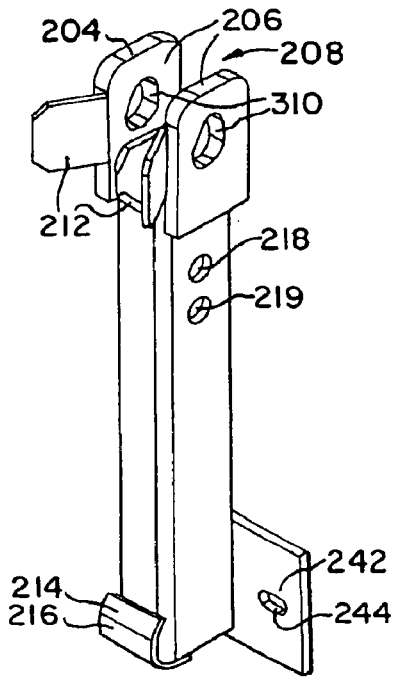

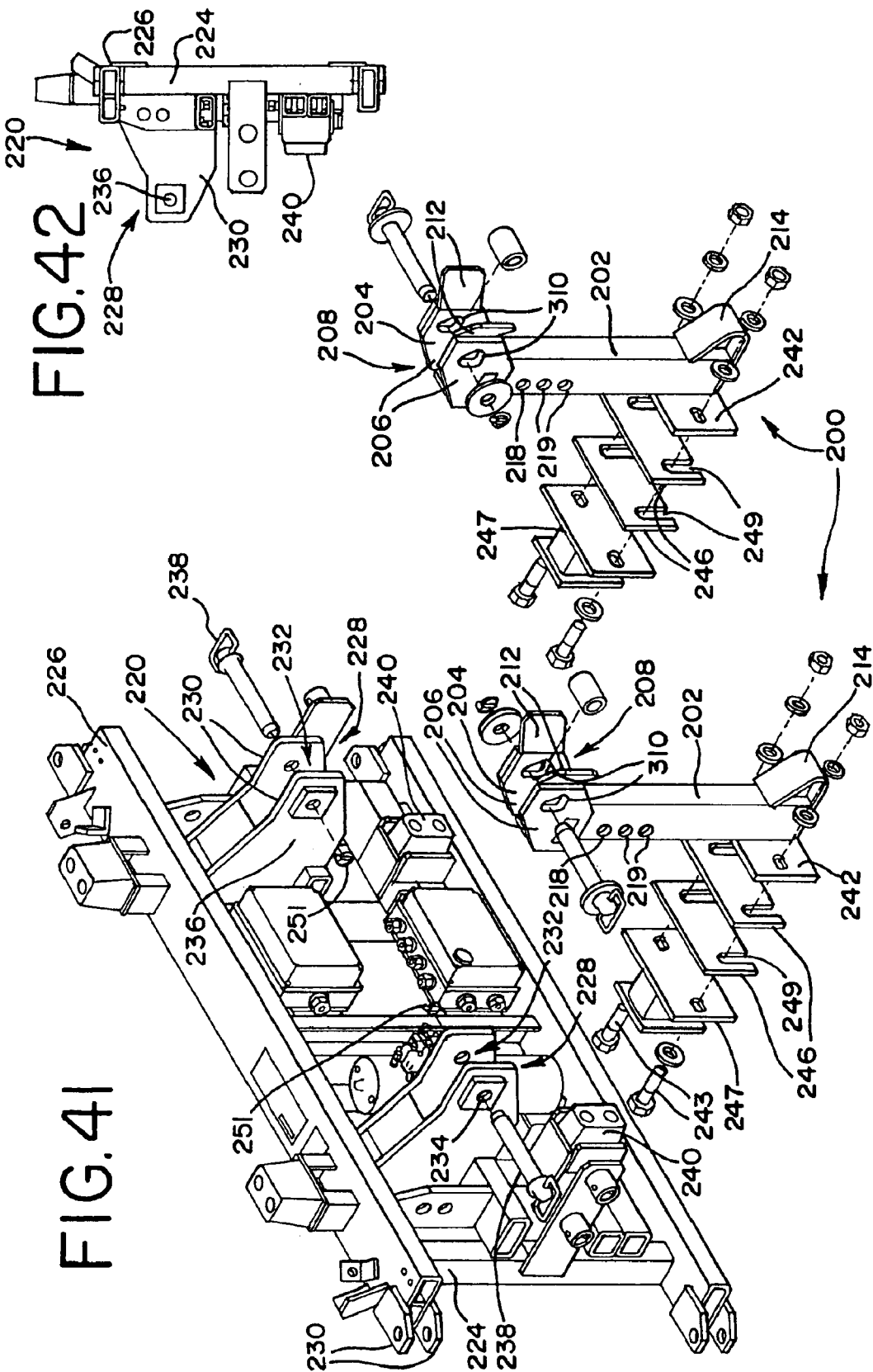

MOUNT FOR TRUCK MOUNTED ATTENUATOR

This application claims the benefit of U.S. Provisional Application Ser. No. 60/464,072, filed Apr. 17, 2003, the entire disclosure of which is hereby incorporated herein by reference.

BACKGROUND

The present invention relates to a truck mounted attenuator having an improved mount and a method for the use thereof.

Truck mounted attenuators are widely used to decelerate impacting vehicles while limiting deceleration for occupants of the vehicles to safe levels. Such attenuators are positioned on shadow vehicles such as heavy trucks that are parked in front of work zones. The truck protects the work zone against intrusion from a vehicle that has left the roadway, and the highway crash cushion protects the impacting vehicle and the shadow truck during a collision.

Often, truck mounted attenuators are mounted to the truck frame, or understructure, which is not pivotable. Accordingly, the truck mounted attenuator ordinarily must be lifted to the desired height to enable it to be fastened to the understructure. For example, June U.S. Pat. No. 5,642,792, assigned to the assignee of the present invention, discloses one highway crash cushion that is mounted to a truck via a support frame that includes articulated arms. An energy absorbing element is disposed in the support frame, which is designed to collapse and to decelerate an impacting vehicle in a controlled manner.

In other systems, shown for example in Leonhardt U.S. Pat. No. 6,244,637, also assigned to the assignee of the present invention, the truck mounted attenuator is mounted to a pivotable component of the truck, and in particular, to the tailgate of the truck bed. In this system, the truck bed can be tilted rearwardly such that the tailgate can be engaged with the attenuator mounting structure. The bed is then tilted back to the horizontal position so as to lift the attenuator off of the ground. In this system, however, the weight of the attenuator is supported at least in part by the tailgate, which may have limited structural capabilities.

SUMMARY

By way of introduction, various preferred embodiments of a truck mounted attenuator include an interface structure comprising a pivot mount at a first location and a bearing surface at a second location vertically spaced from the first location. The pivot mount is adapted to be pivotally mounted to a pivotable truck component and the bearing surface is adapted to slidably engage an understructure of the truck. A backup structure is pivotally mounted to the interface structure at a third location and is engaged with the interface structure at a fourth location spaced from the third location. A crash cushion is supported at least in part by the backup structure.

In another aspect, a truck is outfitted with an impact attenuator. The truck has an understructure and a pivotable element pivotally mounted to the understructure. The pivotable element includes a support frame and a bed supported on said support frame. An interface element is pivotally mounted to the support frame of the pivotable element and has a bearing surface bearing against the understructure. A crash cushion is supported at least in part by the interface element.

In yet another aspect, a method for mounting a truck mounted attenuator to a truck includes resting the attenuator on the ground, pivoting a pivotable element of the truck from a substantially horizontal position to a tilted position, pivotally connecting the interface element to the support frame of the truck while the pivotable element is in the tilted position, and pivoting the pivotable element from the tilted position to the substantially horizontal position and thereby lifting the attenuator off of the ground to a deployed position.

The truck mounted attenuator and methods disclosed herein provide significant advantages over other mounting systems. In particular, the tilting capability of the truck component can be used to lift the attenuator off of the ground. In this way, the attenuator does not have to be lifted a substantial amount, if any, and/or oriented to mate with the truck understructure. In addition, the attenuator is mounted directly to the support structure of the pivotable component, which is generally more robust than the tailgate.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 1 is a side view of a first preferred embodiment of the truck mounted attenuator in a deployed position.

FIG. 1A is a side view of the truck mounted attenuator shown in FIG. 1 in a mounting position.

FIG. 2 is a more detailed perspective view of the crash cushion of FIG. 1.

FIG. 7 is a top view of a second preferred embodiment of this invention, showing the frame at an initial stage of collapse during an impact.

FIGS. 8 and 9 are top views of the embodiment of FIG. 7, showing the crash cushion in a partially collapsed position (FIG. 8) and an extended position (FIG. 9).

FIG. 26 is an enlarged side view of one embodiment of the interface element yoke.

FIG. 27 is an enlarged side view of another embodiment of the interface element yoke.

FIG. 28 is a side view of one embodiment of the interface element.

FIG. 29 is a perspective view of the interface element shown in FIG. 28.

FIG. 30 is a side view of another embodiment of the interface element.

FIG. 31 is a perspective view of the interface element shown in FIG. 30.

FIG. 41 is an exploded view of a mounting structure for a crash cushion.

FIG. 42 is a side view of one embodiment of a backup structure.

DETAILED DESCRIPTION OF THE PRESENTLY PREFERRED EMBODIMENTS

Figure 3:
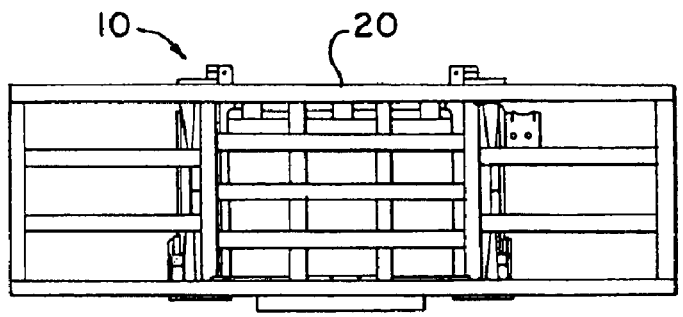
FIGS. 3, 4 and 5 are front, top and side views, respectively, of the crash cushion of FIG. 2.

Turning now to the drawings, FIGS. 1, 1A, 36 and 37 show a crash cushion 10 mounted at the rear of a shadow vehicle or truck T by means of a mounting structure 18. In the embodiment of FIGS. 1 and 1A, the crash cushion 10 includes a frame 12 described in greater detail below. The frame 12 supports an impact face 14 directed away from the truck T, and the frame 12 defines two bays that support respective energy absorbing elements 16, 17. The frame 12 forms a self-supporting structure, and the energy absorbing elements 16, 17 are designed to absorb energy in an impact but not to serve a structural function in the crash cushion 10.

Figure 39:
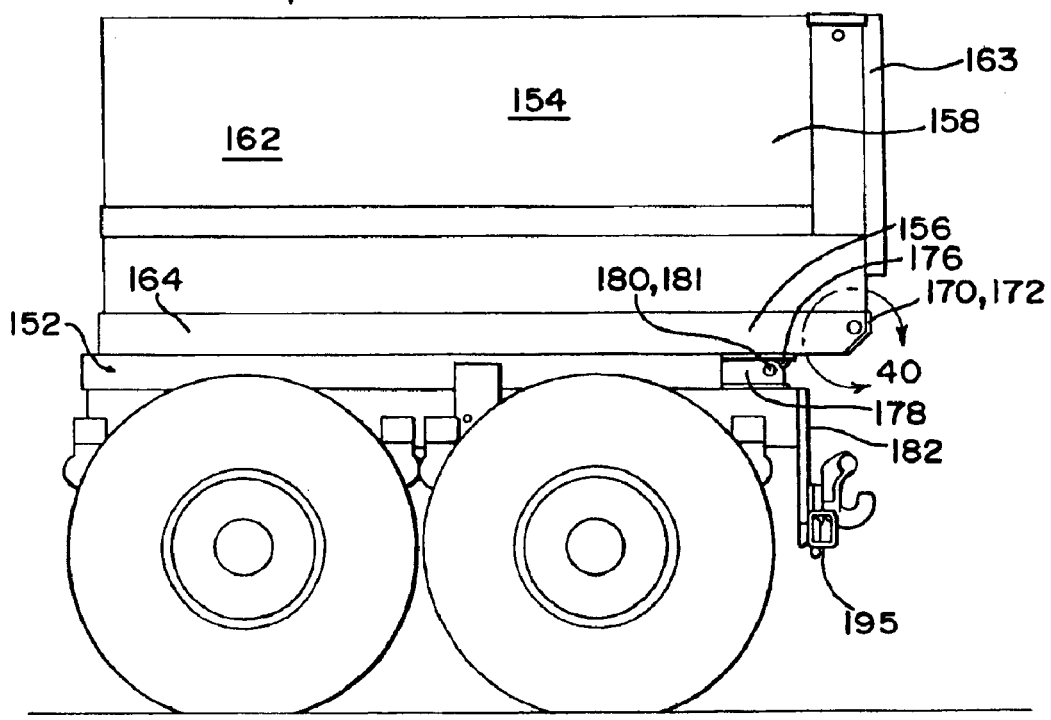
FIG. 39 is a partial side view of a truck.

The preferred mounting structure 18 of FIGS. 1, 1A, 36 and 37 is shown in greater detail in FIGS. 22–31. In one preferred embodiment, and with reference to FIGS. 1, 1A, 22–25, 36, 37 and 39–40, the truck T includes a pivotable element 150 pivotally mounted to an understructure 152. The pivotable element can take many forms, and includes for example and without limitation the dump element 154 shown in FIGS. 1, 1A, 22–25, 36, 37 and 39–40. The dump element includes a lower support frame 156 and a bed 158 mounted to and supported on the support frame. The bed includes a floor 160, a pair of side walls 162 and a tailgate 163 (shown in FIGS. 36, 37 and 39). In other embodiments, the pivotable element may include for example and without limitation a tiltable flat bed or a tiltable enclosed box. As such, it should be understood that the term "bed" refers to any structure supported by an underlying support frame and is not limited to the dump bed shown in the Figures.

In various embodiments, the support frame 156 includes at least a pair of longitudinally extending rails 164. The term "longitudinal" refers to the direction running from the front to the back of the truck, while the term "lateral" refers to the direction running from side to side of the truck. The rails can be formed as I-beams, C-shaped channel sections, box-beams, or any another shape or configuration, and can be made as a single member, or as an assembly of various members.

Figure 22:
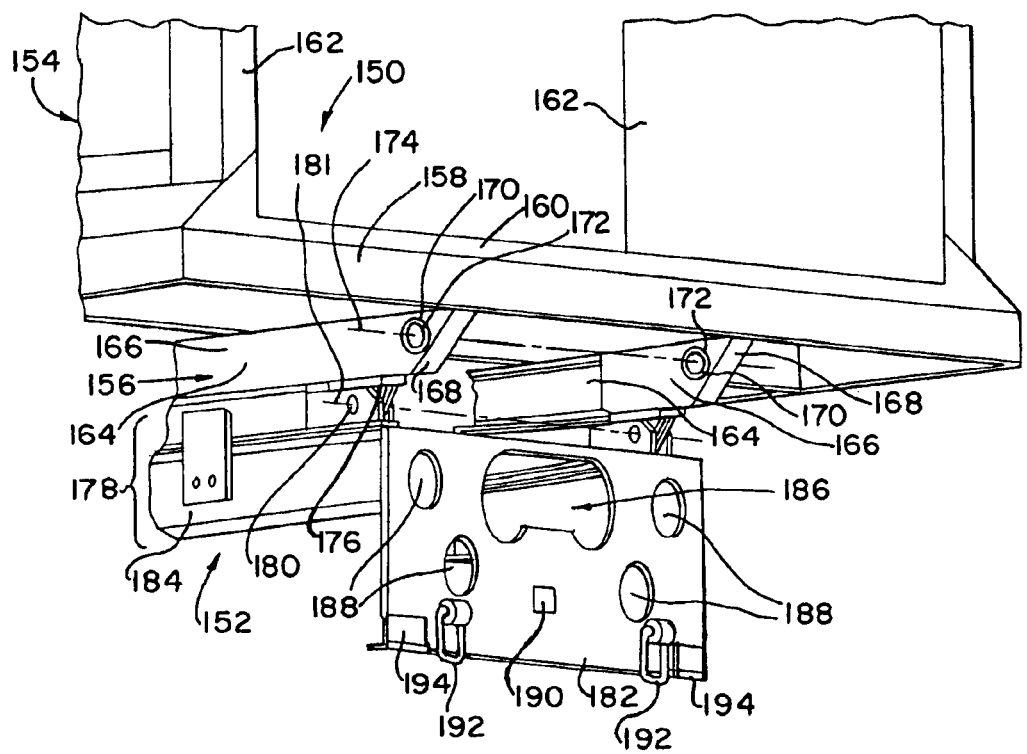
FIG. 22 is a rear perspective view of a portion of a truck.

As shown in FIG. 22, one preferred embodiment of the rail includes a pair of side walls 166, with an end of the rail having a cap 168. In one embodiment, the rail is formed as a channel. A plate is welded on the open side of the channel to box it in forming a box beam. Referring to FIGS. 22 and 29–40, a pair of aligned holes 170 are formed laterally through each rail and the respective side walls adjacent an end thereof. In one embodiment, the hole 170 is located as far rearwardly as possible in the rail so as to maximize the clearance space between the tailgate and the face of the crash cushion. A bushing 172, or tube, is inserted through the hole. In one preferred embodiment, the rails 164 have a thickness of about 2 inches, while the bushing 172 has a length of about 2¾ inches. The bushings define a pivot axis 174. The rails include a pivot mount 176 that is pivotally mounted to an understructure 178, shown as a pair of stacked beams 184, with a pair of pivot pins 180 at a pivot axis 181.

Figure 23:
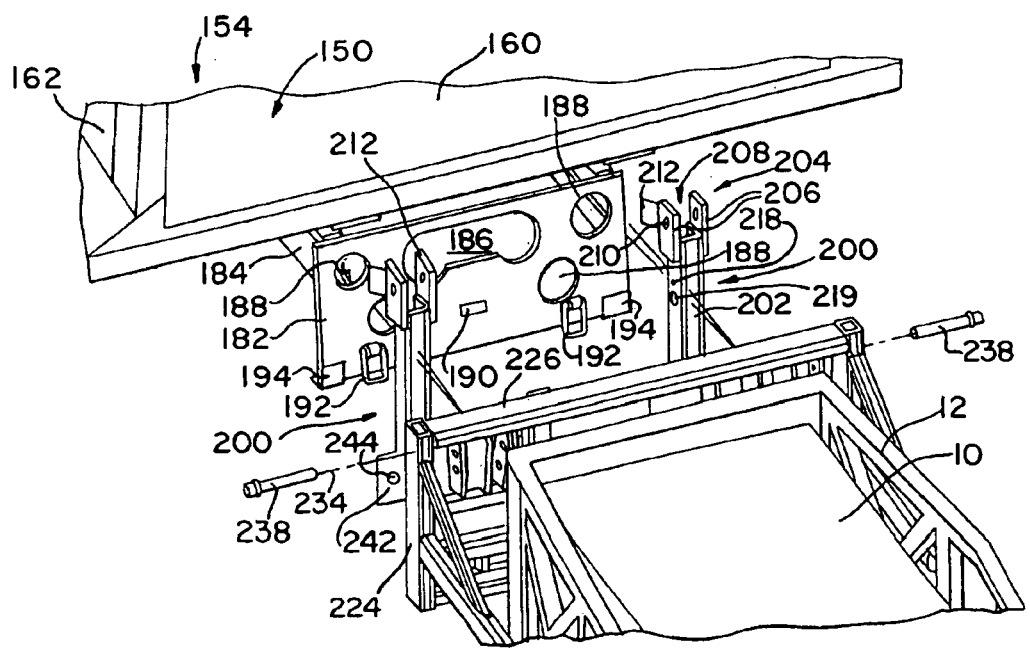
FIG. 23 is an exploded rear perspective view of a truck mounted attenuator positioned adjacent a rear of a truck.
Figure 24:
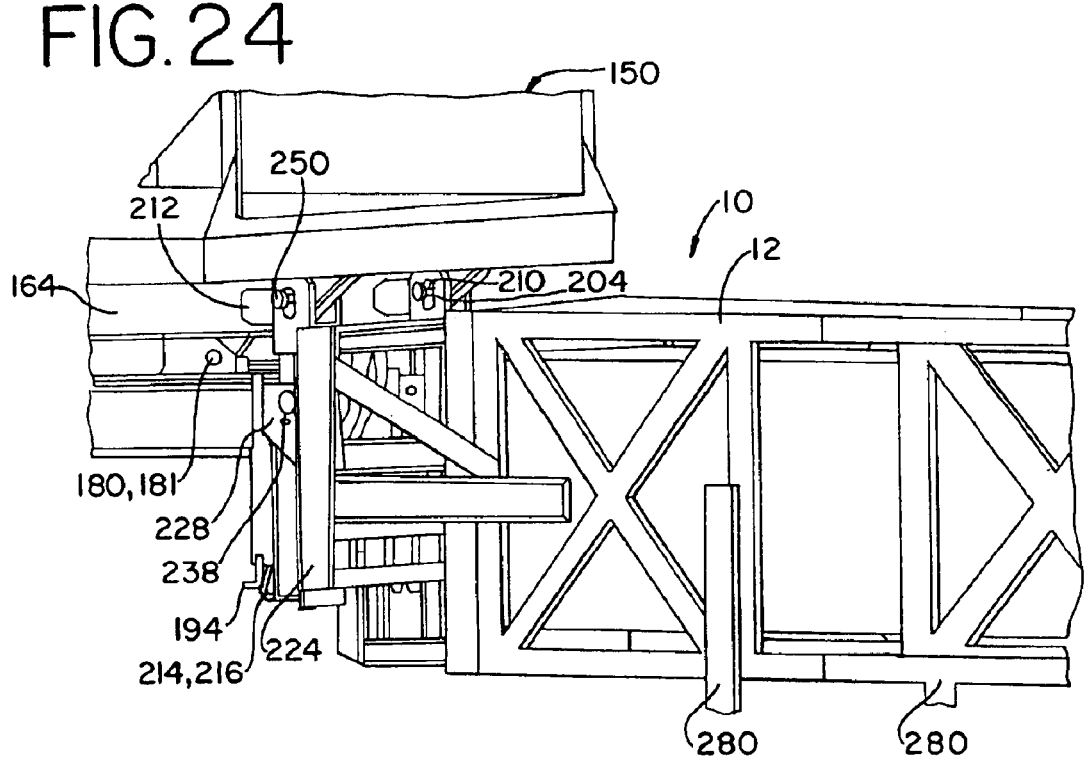
FIG. 24 is rear perspective view of a truck mounted attenuator mounted to the rear of a truck.

Referring to FIGS. 22 and 23, the understructure 178 further includes a plate 182 mounted to the ends of the beams 184. The plate is attached to the beams by welding or with mechanical fasteners and the like. The plate includes an opening 186 that provides access to various hydraulic components and the like positioned under the bed of the truck on a front side of the plate. Four other openings 188 provide mounting locations for various taillights (not shown). Below the opening 186, a square opening 190 provides a socket for a trailer hook/hitch. A pair of loops 192 are secured to a lower portion of the plate. The loops can be used to secure safety/towing chains and the like.

In one embodiment, the plate 182 has lower chamfered corners that are covered or filled in with a pair of auxiliary bearing plates 194. It should be understood that the corners can remain unchamfered to provide a bearing surface, or that any other portion of the plate can be used as a bearing surface. The plate 182 and bearing plates 194 are preferably made of metal, for example and without limitation steel, aluminum etc., or any other rigid material, including for example and without limitation composite materials or wood. In another embodiment, shown in FIG. 39, a stand-off member, shown as a box beam 195, can be secured to the plate to move the bearing surface rearwardly as required.

It should be understood that various vehicles, including the trucks shown herein, can be retrofitted to support the crash cushion by forming a beam rail 164 from the channel, drilling the holes 170 and inserting the bushing 172. In addition, the plates 194 or other bearing members can be secured to the plate 182.

Figure 25:
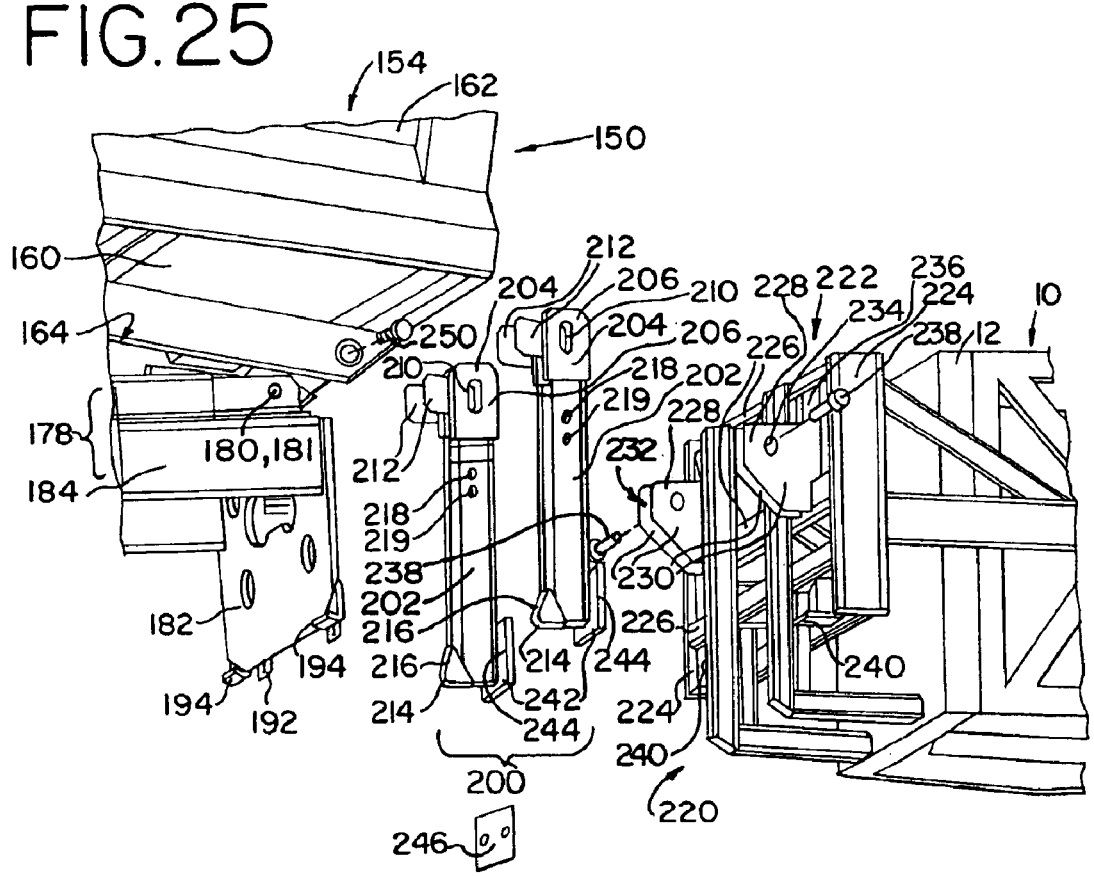
FIG. 25 is an exploded side perspective view of a truck mounted attenuator positioned adjacent the rear of a truck.
Figure 32:
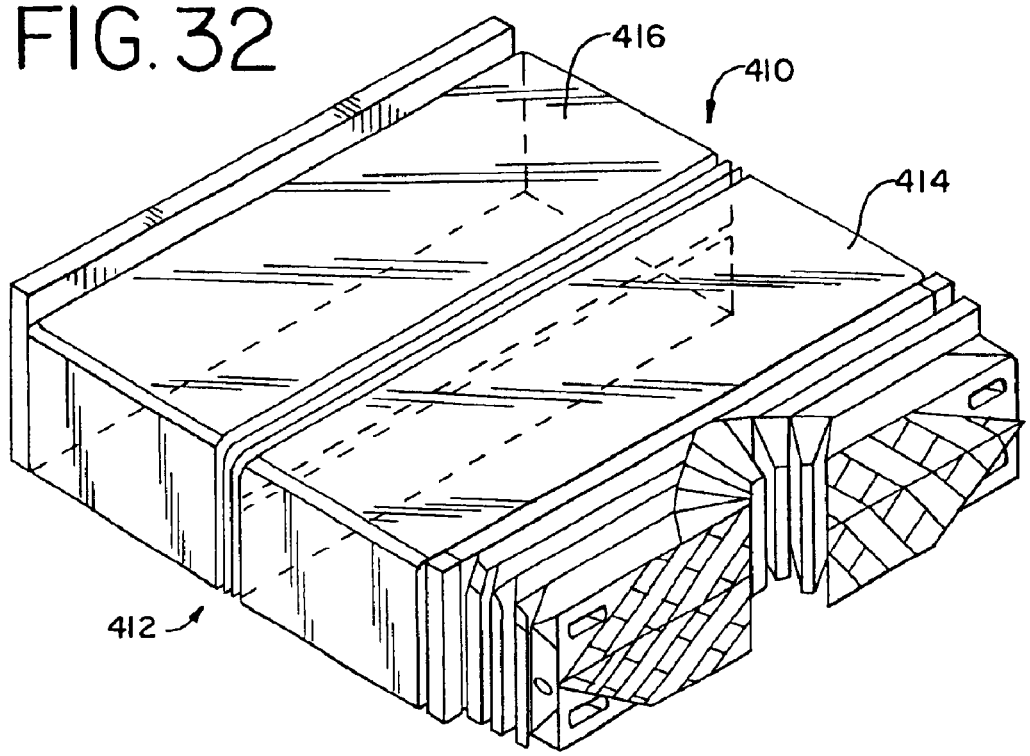
FIG. 32 is a perspective view of an alternative embodiment of a crash cushion.

Referring to FIGS. 23–25, 38 and 41, the attenuator mounting structure 18 includes an interface element or structure 200. The interface element includes a pair of laterally, or horizontally spaced and vertically extending uprights 202, shown in FIGS. 23–31, 38 and 41. In various preferred embodiments, the uprights are formed as an I-beam, a C-shaped channel, a box beam, or any other shape, and can be made of a single member or as an assembly of various members. Preferably, the interface element, including the uprights, are made of metal, including for example and without limitation steel, aluminum, etc., or any other rigid material, including for example and without limitation composite materials or wood. Each upright 202 includes a yoke 204 formed at the upper end thereof. Each yoke 204 has a pair of spaced apart flanges 206 defining a gap 208 therebetween. Preferably, the gap has a width of about 3 inches. As shown in FIG. 25, each yoke 204 has a pair of vertically elongated slots 210 aligned and formed in the opposing flanges 206. Alternatively, as shown in FIG. 26, an opening 300 has a substantially tear-drop shape, and includes an upper portion 302, preferably formed with a first radius and having a downwardly curved bearing surface 304 and an enlarged lower portion 306, preferably formed with a second radius that is greater than the first radius, that communicates with the upper portion and provides a keyway. In other embodiments, shown in FIGS. 27–29, 38 and 41, an opening 310 includes an upper portion 302 with bearing surface 304 and an enlarged lower portion 312 that is enlarged in a forwardly extending direction with a linear rear side edge 314, a bottom edge 316 and an angled forward side edge 318, with curved transitions 320 joining each of the edges.

Referring to FIGS. 23–31, 38 and 41, a pair of ears 212 or guides are secured to a front edge of each yoke 204 flange. The guides 212 extend forwardly and are angled outwardly.

A lower end of the uprights 202 is provided with a cam or nose 214 on the front of the upright. The nose 214 defines a bearing surface 216. The nose extends forwardly from the upright and the bearing surface 216 is preferably outwardly curved, or convex. Of course, it should be understood that any portion of the upright, including for example a front surface thereof, or the lower end thereof, can be used as a bearing surface. In the embodiment of FIGS. 28 and 29, the nose 214 further has a concave upper portion 322 with an inwardly curved portion or undercut, which allows the upright to be angled at a greater angle to the substantially vertical deployed position (and the crash cushion to be angled at a greater angle to the substantially horizontal deployed position) as the plate or understructure is received in the recess 324 formed by the upper portion.

Referring to FIGS. 25–31, 38 and 41, a plurality of openings 218, 219, shown as two (or three in the embodiment of FIGS. 38 and 41), are formed laterally through each upright. The term "plurality" refers to two or more. The openings are preferably vertically spaced about 2 inches. It should be understood that other spacings would also work. In various embodiments, the spacing can be between 1½ and 3 inches.

Figure 38:
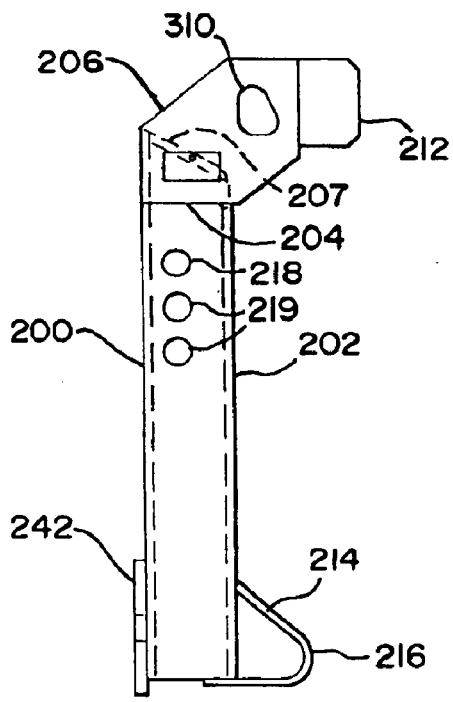
FIG. 38 is a side view of an alternative embodiment of an interface element.
Figure 40:
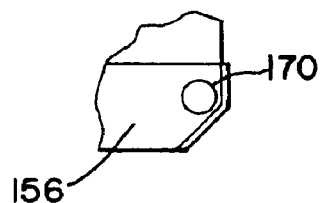
FIG. 40 is an enlarged partial view of a support frame rail taken along line 40 of FIG. 39.

Referring to the embodiment of FIGS. 38 and 41, the flanges 206 of the yoke extend forwardly, such that the opening 310 is positioned forwardly of the upright beam. In addition, the nose 214 is elongated such that the bearing surface 216 is positioned to engage the bearing surface on the truck when the interface element is secured to the truck with the attenuator in the deployed position. Therefore, in this embodiment, the backup structure 220 and crash cushion are positioned further rearwardly from the back end of the truck to provide more clearance, for example when the crash cushion is folded over on itself for transport. As a result, the opening 310 is longitudinally forwardly offset from the openings 218, 219, while those openings are aligned in the embodiments of FIGS. 28 and 30 for example. In addition, the top of the beam 207 is angled to provide more clearance while maximizing the amount of connection between the beam and the yoke flanges.

Referring to FIGS. 24, 25, and 41–42 a backup structure 220 is connected to the crash cushion, and in particular, the frame 12. The backup structure includes a frame 222 having a plurality of horizontal and vertical frame members 224, 226. A pair of forwardly extending yokes 228 are mounted to the frame and include spaced apart flanges 230 forming a gap 232 therebetween. The flanges 230 each have a hole 234 extending laterally therethrough to define a pivot axis 236. A pair of forwardly extending bearing plates 240 are secured to a lower portion of the frame in a vertically spaced relationship to the pivot axis 236. Alternatively, the bearing plates can be configured as bumpers, including various rubber or elastomeric materials.

Referring to FIGS. 24–31, 38 and 41, a plate 242 is secured to the rear of the upright at a lower end thereof. The plate is provided with a plurality of openings 244. One or more shims 246 can be bolted to the plate 242 with a plurality of fasteners 243 (shown as two). As shown in FIG. 41, a pair of shims 246 have slotted openings 249 permitting them to be removed without the fasteners 243 being removed, but rather only loosened. A spacer/shim 247 is positioned as a rearwardly extending member that engages the backup structure. It should be understood that the plate 242 could be bolted to the backup structure, with the shims then secured to the plate on the backup structure.

In operation, and referring to FIGS. 1, 1A, 22–25, 36, 37 and 41, the interface element or structure 200 is secured to the backup structure 220. In particular, the operator first determines whether the truck that will be used to support the attenuator is loaded or not, and the degree of loading. If the truck is loaded, the upper openings 218 of the interface uprights are aligned with the openings 234 in the backup structure yokes and a pair of pins 238 are inserted through the openings to secure the uprights to the backup structure. A pair of linch pins 251 or cotter pins can be used to secure the ends of the pins 238. The uprights are received in the gaps 232 formed by the yokes 228. The plates 242 secured to the uprights are then allowed to bear up against or abuttingly engage the plates/flanges 240 or bumpers on the backup structure. It should be understood that the plates 242 can be secured to the backup structure and engage a corresponding bearing member 240 or other portion of the interface uprights. One or more shims 246 or spacer members 247 can be secured to the plate, with a rearwardly facing face of the shim or spacer member then abuttingly engaging the flange 240 or other bearing member of the backup structure. In one embodiment, the spacer member or bearing members interfacing between the backup structure and interface element and/or between the interface element and the truck could be biased with a spring and/or dampened with a shock absorber.

If the truck is unloaded, or riding high, the lower openings 219 of the uprights are aligned with the openings 234 formed on the backup structure. It should be understood that the yokes 228 could be provided with a plurality of vertically spaced pairs of openings, one pair of which is aligned and pivotally connected with an opening in the uprights. It should also be understood that more than two vertically spaced openings can be provided in either the uprights or backup structure to provide additional adjustment capability.

After the interface element 200 is secured to the backup structure 220, the assembly is secured to the truck. It should be understood, however, that the interface element 200 can first be secured to the truck, and then secured to the backup structure 220. In the first sequence, the pivotable element 150 of the truck is tilted upwardly and rearwardly until the guides 212 are aligned with the rails 164. In this position, the crash cushion 10 is resting on the ground, as shown in FIG. 1A. The unique interface between the pivotable element 150 and the interface element 200 allows a single operator to connect the crash cushion in a minimal time with no tools. In addition, the operator can easily install the crash cushion even if it is misaligned relative to its deployed position, e.g., when the ground is uneven or one end is sticking up in the air, as shown for example in FIG. 1A. In particular, the crash cushion can be easily installed even if it is oriented at an angle of ±5 degrees relative to its deployed/installed orientation, e.g., a horizontal position.

The attenuator is then either pushed forwardly or the truck is backed rearwardly such that the rails 164 are received between the guides 212 and guided into the gaps 208 formed by the yokes 204. The pivotable element 150 can be further tilted one way or the other, or jacks 280 can be manipulated, to align the openings 170, 210 in the rails and the yokes. A pair of pins 250 are then inserted through the bushing 172 and the yoke openings 210, 300, 310 to pivotally mount the interface uprights 202 to the rails 164. The unique shape of the openings 300, 310 can facilitate the installation of the pins 250, which can initially be installed through the enlarged lower portions 306, 312 of the openings, which lower portions are generally aligned with the opening in the pivotable element. The enlarged opening provides for greater tolerances and ease of alignment.

Figure 36:
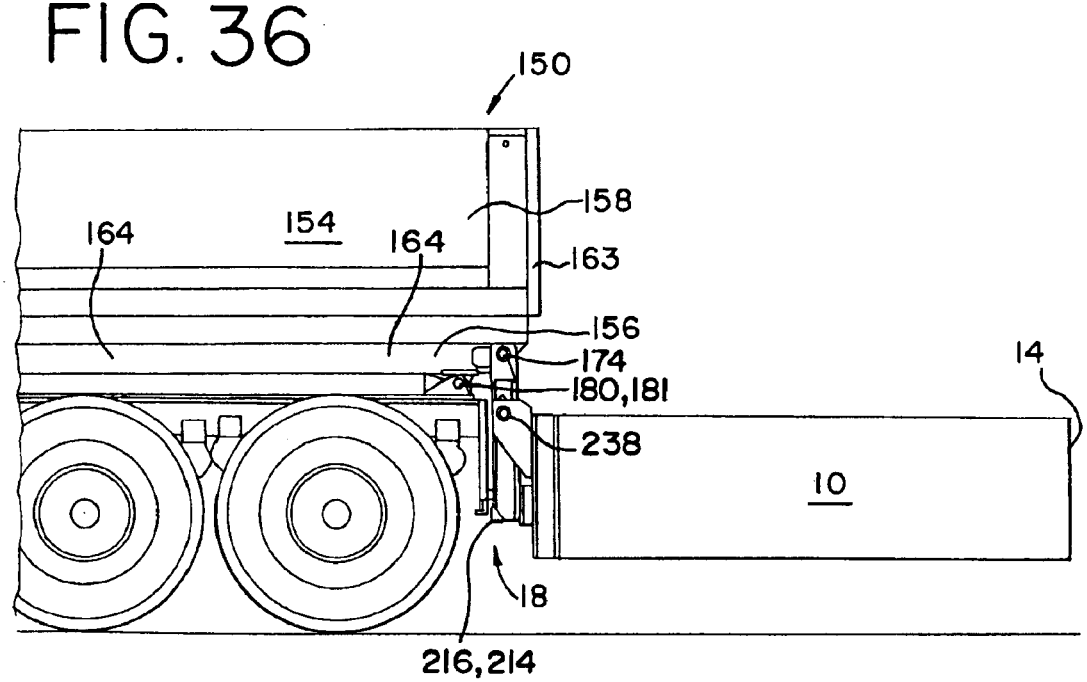
FIG. 36 is a side view of an alternative embodiment of a crash cushion connected to a truck.
Figure 37:
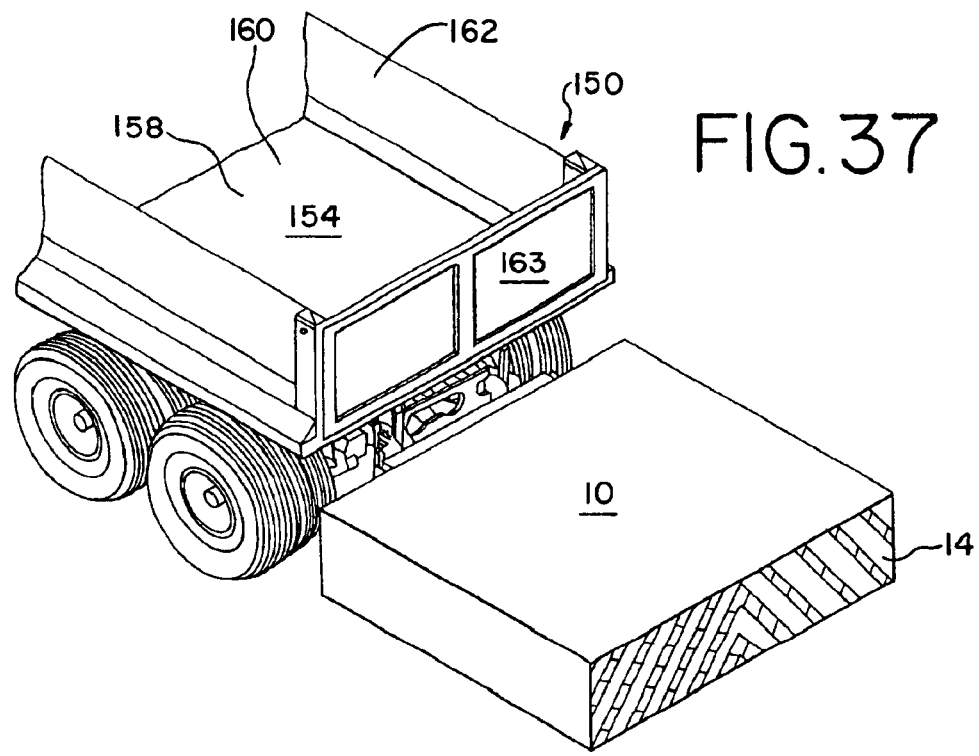
FIG. 37 is a perspective view of the assembly shown in FIG. 36.

After the pins are inserted, the operator then simply lowers the pivotable element 150, as shown in FIG. 1, thereby raising the attenuator as the lower portion or nose 214 of the uprights, and in particular the bearing surface 216, bears up against and slides along the plate 182 or bearing plates 194. Referring to the embodiments of FIGS. 26 and 27, and as shown in FIG. 36, as the pivotable element 150 is lowered, the pins 250 ride up into the upper portions 302 of openings 300, 310, with the pins bearing against surface 304.

The pivotable element 150 is tilted downwardly until it is substantially horizontal, at which point the attenuator is in the deployed position and is supported by the backup structure and by the interface element by way of the backup structure. As such, the term "supported" refers to one element supporting another directly or indirectly by way of one or more other elements. If the tail end of the attenuator is too low when in the deployed position, one or more shims 246 can be inserted between the plates or bearing members 242, 240 on the interface uprights and backup structure and thereafter mounted to one of those plates/members so as to level the attenuator. This entire procedure can be carried out by a single operator.

It should be understood that the opposite procedure can be followed to disengage the attenuator from the truck. In particular, the operator tilts the pivotable element until the attenuator rests on the ground and then removes the pins so as to disengage the interface element from the truck.

Referring to FIGS. 1, 1A and 22–25, if the uprights 202 are first secured to the pivotable element 150, the pivotable element can be tilted rearwardly until the openings 218, 219 in the uprights are aligned with the openings 234 in the yoke. The attenuator can be manipulated, for example with a jack 280, to further align the openings. The pivotable element 150 is then tilted forwardly to lift the attenuator.

In either embodiment, the downward tilting motion of the pivotable element 150 automatically raises the attenuator. The simple tilting action of the pivotable element can also be used to align the mounting points or holes 170, 210 or 218, 219, 234. Moreover, the multiple mounting interfaces or openings 218, 219 between the interface element and the backup structure allows the user to adjust the height of the attenuator to suit the particular characteristics of the carrier vehicle, i.e., the height of the under structure 152 and pivotable element 150.

It should be understood that the crash cushion 10 and backup structure 220 can swing away from the interface element 200 about the pivot axis 236 such that the plate 240 of the backup structure is disengaged from the plate 242 or shims 246. Such action can occur, for example, when the truck travels over a large bump, and the tail end of the crash cushion is raised. Alternatively, or simultaneously, the bearing surface 216 of the nose 214 of the interface uprights, or any other bearing surface thereof bearing against the understructure, can become disengaged from the understructure plate 182, 194 as a result of the tail of the crash cushion being raised. In essence, the interface element 200 is pivotally mounted to the truck at a pivot axis 174 and is releasably supported by the truck at a location (defined by the interface between the bearing surface 216 and the plate 194) spaced below the pivot axis. Likewise, the backup structure 220 and crash cushion 10 are pivotally mounted to the interface element at a pivot axis 236 and are releasably supported by the interface element at a location (defined by the interface between the plates and/or shims 240, 242, 246) spaced below the pivot axis. It should be understood that in one embodiment the pivot axes 174, 236 of the interface element/truck mount and the interface element/backup structure mount can be coaxial. Of course, it should be understood that one or the other of those interfaces may be fixed.

In another embodiment, an interface element separate from the backup structure is eliminated altogether and the backup structure yokes 228 are directly connected to the rails 164, with a lower portion of the backup structure bearing against the plate 182, 194. In this embodiment, the yokes of the backup structure can be configured like the yokes of the interface element if necessary. The backup structure yokes or truck rails can be provided with two or more vertically spaced openings to provide adjustment capability to the attenuator. One or more shims can be secured to the truck understructure or plate, or to the backup structure to provide leveling capability. It should be understood that in this embodiment, the yokes and lower bearing portion of the backup structure form an "interface" structure or element which is integral to the backup structure.

It should be understood that the mounting structure can be used to support any type of crash cushion, including other crash cushions not specifically disclosed herein. Various exemplary crash cushions include the Safe-Stop™ TMA and the Safe-Stop™ 180° TMA, available from Energy Absorption Systems, Inc., having a place of business in Rocklin, Calif. and which is the Assignee of the present application.

Referring to FIG. 2, one embodiment of a crash cushion 10 includes transverse frames 20, 22 and 24 and side frames 26, 27, 28, 30. The impact face 14 of FIGS. 1 and 1A is not shown in FIG. 2 for clarity of illustration, but the face 14 is mounted on the transverse frame 20. In some embodiments, the face 14 can be non-structural or even eliminated.

Figure 4:
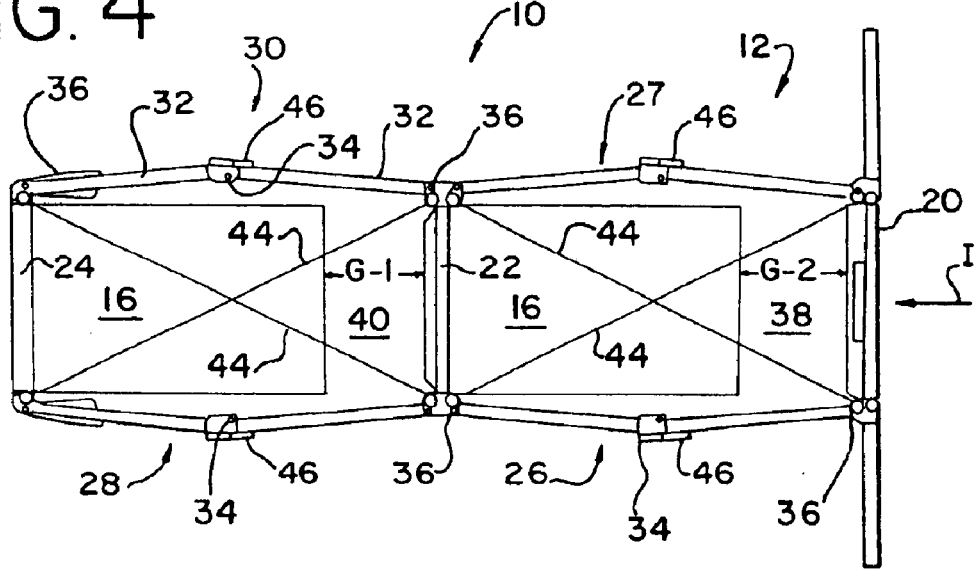

As best shown in FIG. 4, each of the side frames 26, 27, 28, 30 includes two separate side frame elements 32 that are interconnected by a pair of central hinges 34. Additionally, each of the side frame elements 32 is connected by additional hinges 36 to a respective one of the transverse frames 20, 22, 24. As shown in FIG. 4, the side frame elements 32 are bowed outwardly, and the hinges 34 are positioned to allow the side frame elements 32 to move outwardly in an impact.

The transverse frames 20, 22 and the side frames 26, 27 form a first bay 38 that contains the first element 16. Similarly, the transverse frames 22, 24 and the side frames 28, 30 form a second bay 40 that contains the second elements 16, 17. The energy absorbing elements 16 are attached to and cantilevered from respective transverse frames 22, 24.

Figure 5:
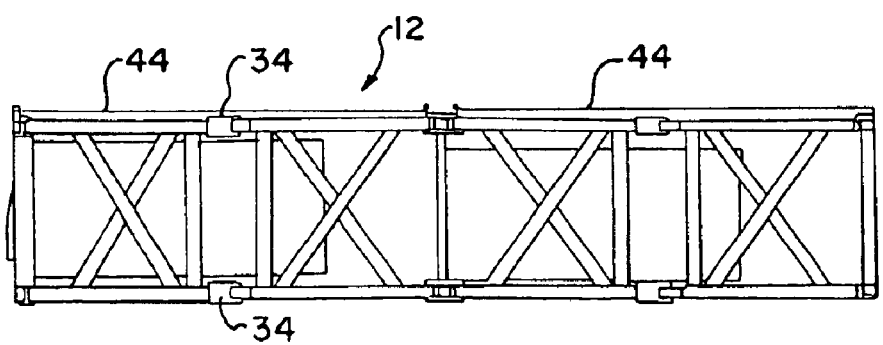
Figure 10:
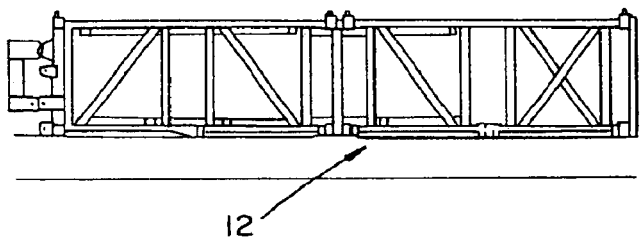
FIGS. 10 and 11 are side views of the embodiment of FIG. 7, showing the crash cushion in an operational, horizontal position (FIG. 10) and a vertical, transport/storage position (FIG. 11).
Figure 11:
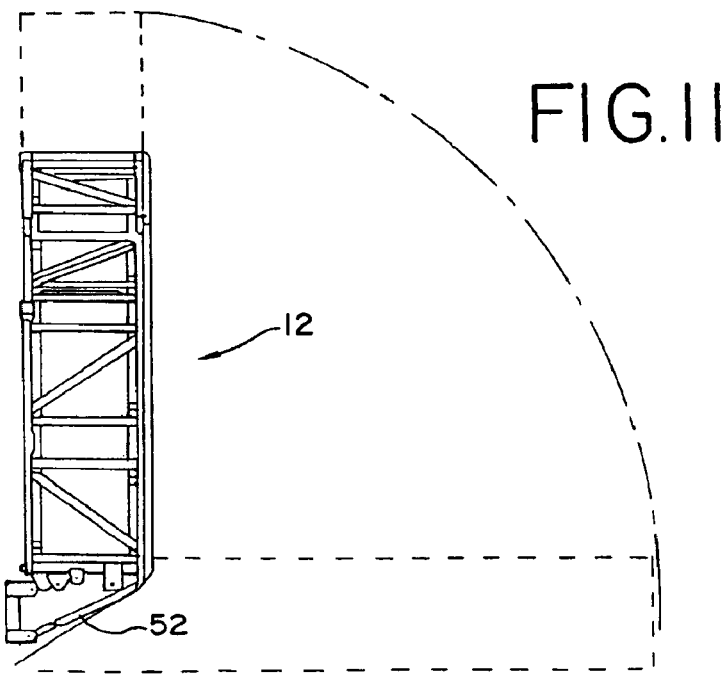

As shown in FIG. 11, one or more hydraulic cylinders 52 can be provided in the mounting structure 18 to pivot the frame 12 between the horizontal, operational position shown in FIG. 10, and the vertical, storage/transport position shown in FIG. 11. Cross braces 44 are mounted between the transverse frames as shown in FIGS. 4 and 5 to provide stability prior to impact. These cross braces 44 have been left out of the remaining figures for clarity of illustration.

Figure 6:
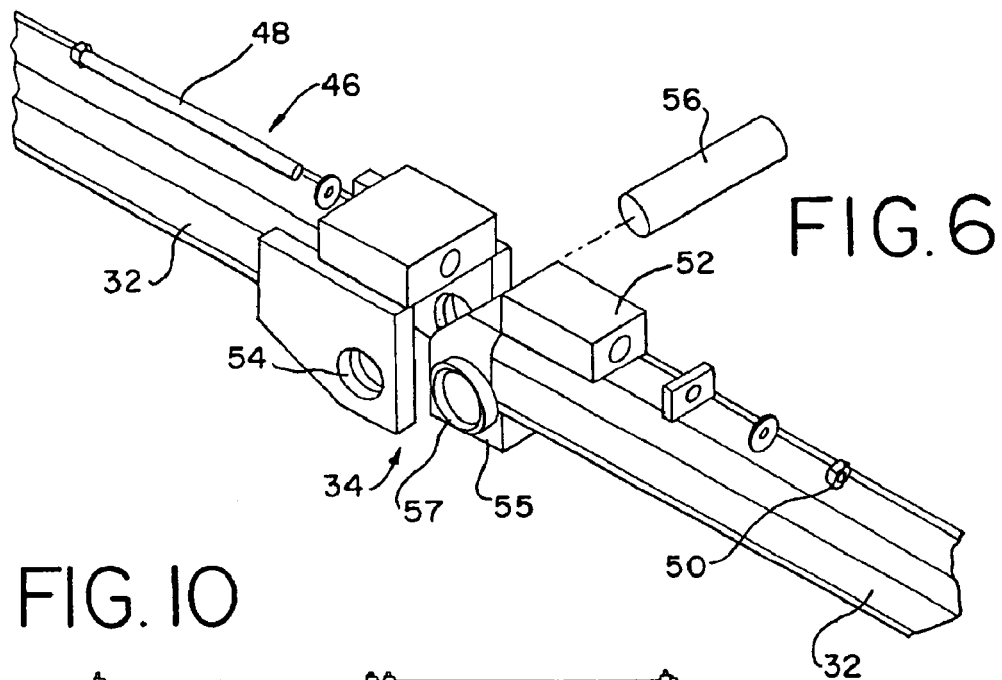
FIG. 6 is a detailed view of a hinge and restraint included in the embodiment of FIG. 2.

FIG. 6 provides an exploded perspective view of one of the hinges 34 and the associated side frame elements 32. The hinge 34 is shown in a rotated position for clarity of illustration. Normally the hinges 34 are oriented with vertical hinge axes, as shown in FIGS. 2 and 4.

The frame can also be provided with tensioning elements (not shown) extending between opposite sides of the frame. The tensioning elements can be provided with mechanical fuses (not shown) as disclosed in U.S. patent application Ser. No. 10/025,025, filed Dec. 19, 2001, the entire disclosure of which is hereby incorporated herein by reference.

As shown in FIG. 6, a restraint 46 is associated with each of the hinges 34. In this embodiment, the restraint 46 takes the form of a bolt 48 and a nut 50. The bolt 48 is passed through openings in mounting blocks 52, and the mounting blocks are rigidly secured in place on respective ones of the side frame elements 32. The hinge 34 in this embodiment is formed by a pin 56 that is received within openings 54, 55. The opening 55 may be formed by a sleeve 57 received in one of the hinge parts.

When the crash cushion 10 is in the operational position shown in FIGS. 1, each of the eight hinges 34 is held in the closed position by the respective restraint 46. Note that the hinges 34 are positioned in such a way that compressive forces applied to the frame 12 by an impacting vehicle (not shown) striking the transverse frame 20 along the impact direction I (FIG. 4) apply tensile forces to the respective restraints 46. When these tensile forces exceed the strength of the respective bolts 48 (FIG. 6), the bolts are broken, thereby freeing the hinges 34 to open outwardly, and allowing the transverse frames 20, 22, 24 to approach one another and to compress the energy absorbing elements 16, 17.

FIGS. 7 through 11 relate to a second preferred crash cushion, which is in many ways similar to the first crash cushion described above. Comparable elements are given comparable reference numbers. The crash cushion of FIGS. 7 through 11 differs from the crash cushion 10 described above in that the side frame elements 32 secured to the first transverse frame 20 are additionally provided with auxiliary hinges 58. As shown in FIG. 7, during a normal impact the hinges 58 remain closed and the embodiment of FIGS. 7 through 11 operates quite similarly to the embodiment described above in conjunction with FIGS. 1 through 6.

As shown in FIGS. 8 and 9, this embodiment also includes cables 60 and 62. The cables 60 are connected to respective ones of the forward side frame elements 32 adjacent to the auxiliary hinges 58. When the cables 60 are tightened and the cable 62 is loosened, forces are applied to the forward side frame elements 32 to close the auxiliary hinges 58 and to extend the first transverse frame 20 away from the second transverse frame to the operational position shown in FIG. 9. Conversely, when the cables 60 are loosened and the cable 62 is tightened, the first transverse frame 20 is pulled toward the second transverse frame 22 as the auxiliary hinges are opened, as shown in FIG. 8. In this way the overall length of the crash cushion is reduced. The hinges 58 may be spring biased toward the opening direction to facilitate this movement.

Preferably, the cables 60, 62 are attached to a mounting structure similar to that discussed above in such a way that the cables 60, 62 are loosened and tightened as described above automatically as the crash cushion is rotated between the horizontal, operational position of FIG. 10 and the vertical, travel/storage position of FIG. 11. Thus, when the crash cushion is raised to the vertical position of FIG. 11, the cables 60 are automatically loosened and the cable 62 is automatically tightened to shorten the travel height of the crash cushion automatically. Conversely, as the crash cushion is lowered to the operational position shown in FIG. 10, the cables 60 are automatically tightened and the cable 62 is automatically loosened to extend the first transverse frame 20 to the operational position shown in FIG. 9. In this way, the overall height of the crash cushion 10 in the travel position can be maintained at the desired level, such as no more than about 13 feet above the roadway.

The cables 60, 62 and the auxiliary hinges 58 function as a means for automatically collapsing the first bay as the crash cushion is rotated from the horizontal to the vertical position, and as a means for automatically extending the first bay as the crash cushion is rotated from the vertical to the horizontal position. These elements also function as a means for at least partially collapsing the frame 12 to shorten its length for storage.

The means for automatically extending and retracting the frame 12 can take many other forms. For example, the means for extending the frame may include a spring-biased system that causes the first bay of the frame 12 to remain fully extended when the retraction cables are loosened. If desired, one or more latches can be provided so that in the travel position and/or the operational position the configuration of the crash cushion 10 is maintained by some means other than tension on the cables.

Figure 13:
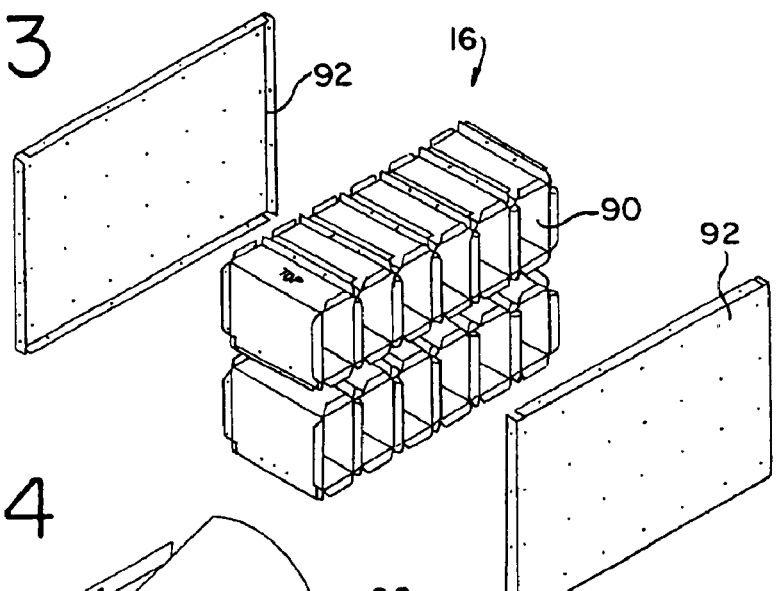
FIG. 13 is an exploded perspective view of a portion of one energy absorbing element suitable for use with this invention.

FIG. 13 shows a preferred structure for one of the energy absorbing elements 16, 17. As shown in FIG. 13, a plurality of sheet metal rectangular cells 90 are disposed between cover plates 92. In an impact, these sheet metal elements are crushed to provide a controlled decelerating force. The cells 90 and the cover plates 92 of FIG. 13 are similar to corresponding elements of U.S. Pat. Nos. 4,711,481 and 5,199,755, assigned to the assignee of the present invention and hereby incorporated by reference in their entirety.

Another preferred structure for the energy absorbing element of FIG. 1 includes a plurality of tapered deformable elements. Tapered deformable elements can take many forms, and several examples are shown in FIGS. 14–21. In general, the tapered deformable elements can be formed as separate, stand-alone tapered elements that are stabilized by fastening both ends of the tapered elements to a frame of some type, such as for example by use of rivets, welds, adhesives or other fasteners. Alternately, the tapered deformable elements can be formed in one or two dimensional arrays.

Figure 14:
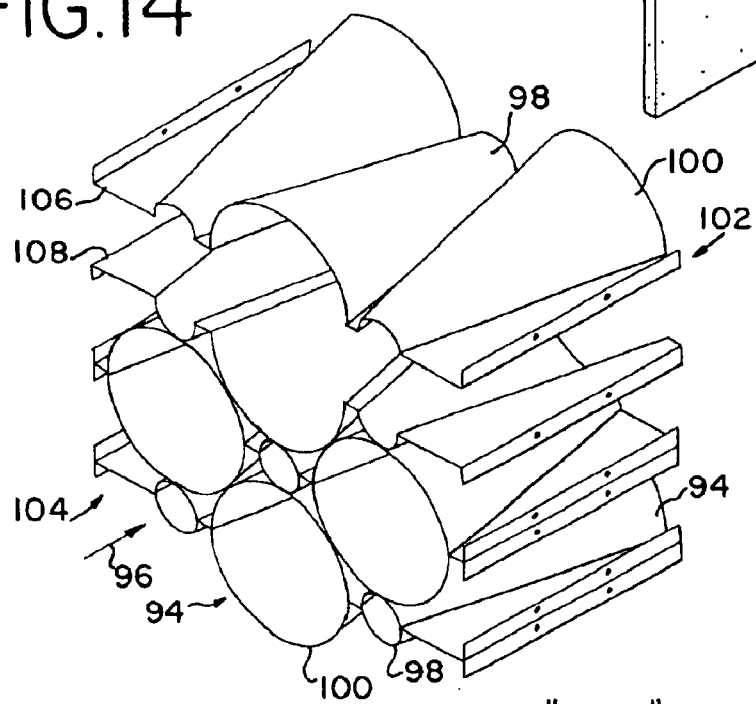
FIGS. 14 and 15 are a perspective, partially exploded view and a front view, respectively, of deformable sheet metal elements suitable for use in another energy absorbing element of this invention.
Figure 15:
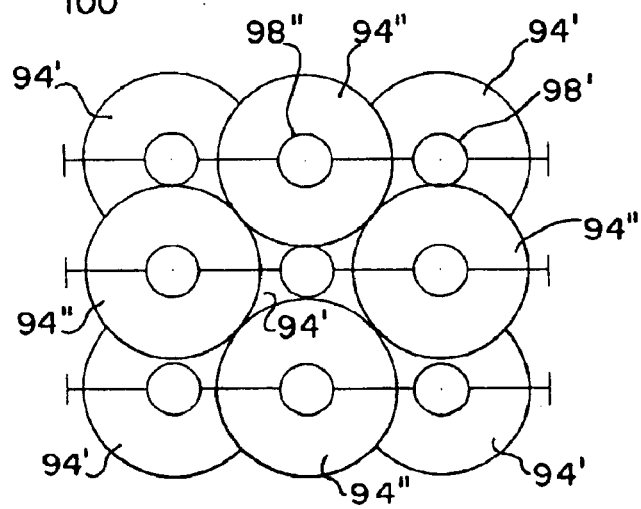

FIGS. 14 and 15 relate to a first type of tapered deformable element 94 in which the elements are generally conical in shape and each includes a small end 98 and a large end 100 spaced along a longitudinal axis 96. As shown in FIG. 14, in this embodiment the tapered deformable elements 94 are closely stacked with some of the small ends 100 oriented toward a first side 102 of the array, and others of the small ends 98 facing the second, opposed side 104 of the array.

In the end view of FIG. 15, the deformable elements are identified as 94' and 94". The elements 94' have their small ends 98' facing the view plane, while the elements 94" have their small ends 98" facing away from the view plane.

Returning to FIG. 14, in this embodiment the deformable elements 94 are formed from two stamped sheets 106, 108 of a sheet material such as sheet aluminum. Depending upon the desired stiffness of the deformable elements, any appropriate gauge and alloy of material can be used. As shown in the uppermost row of FIG. 14, each of the sheets 106, 108 is stamped or otherwise formed to create an array of half cones. The sheets 106, 108 may be physically identical if the half cones are positioned properly on the sheets. When the sheets 106, 108 are mated together, the frustoconical shapes of the individual tapered elements 94 are formed, as shown in the lower two rows of FIG. 14. The sheets 106, 108 can be held together in any suitable manner, as by spot welding, riveting, fastening, or adhesively holding them together or to an external frame (not shown).

Figure 16:
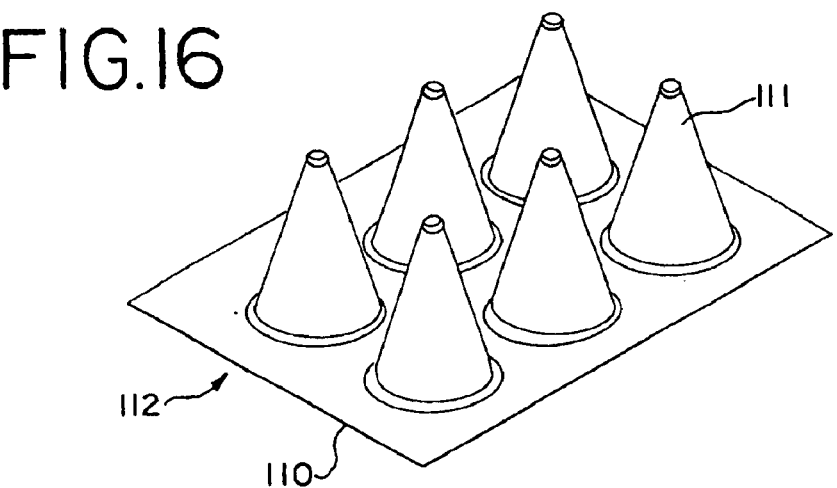
FIGS. 16 and 17 are upper and lower perspective views of a one-directional array of tapered deformable elements.
Figure 17:
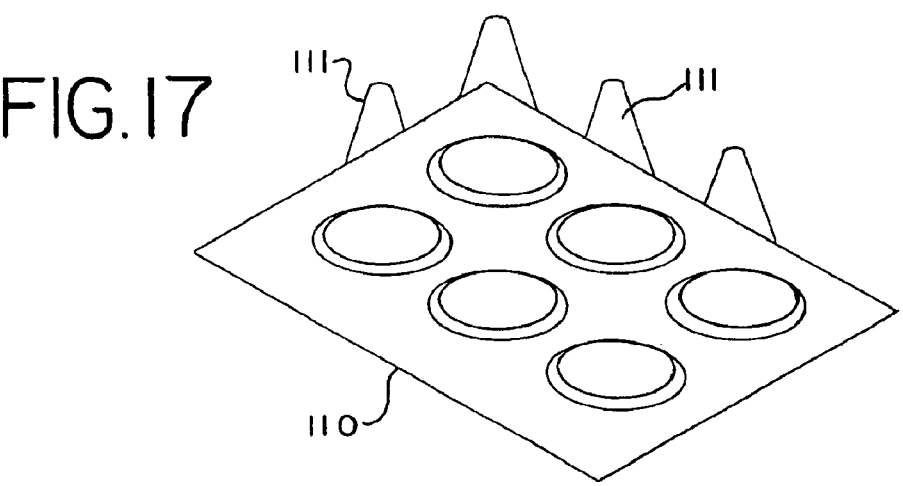
Figure 18:
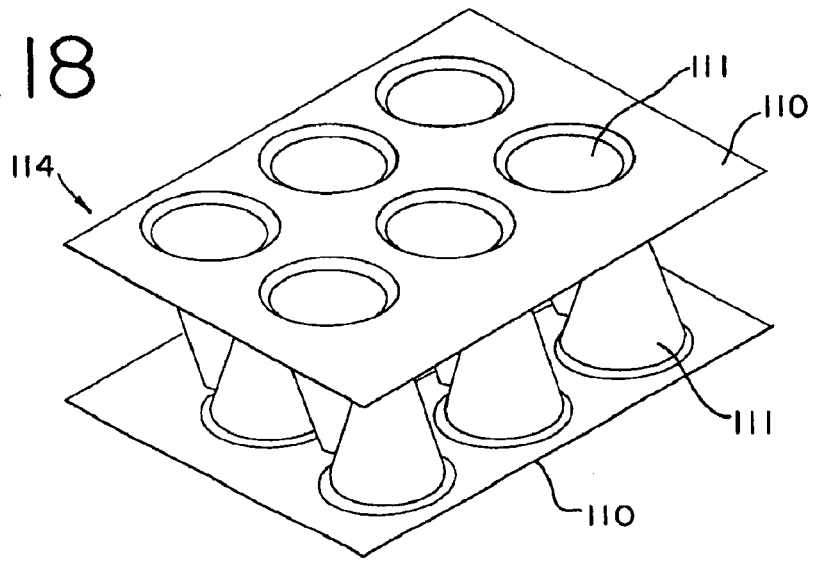
FIG. 18 is a perspective view of a bidirectional array of tapered deformable elements.

FIG. 16–18 relate to another preferred embodiment, in which the tapered deformable elements 111 are each formed from a single sheet 110 of a sheet material such as sheet aluminum. In this case the tapered deformable elements 111 are stamped or drawn from the sheet 110 in a conventional stamping or drawing operation. Thus, the single sheet 110 forms all of the associated tapered elements 111, along with the remaining planar portion of the backing sheet.

As shown in FIGS. 16 and 17, a single sheet 110 of the tapered deformable elements 111 can be used to form a unidirectional array. Alternatively, as shown in FIG. 18, two of the sheets 110 can be nested together to form a bidirectional array, in which the smaller ends of the elements 111 of one sheet face a first direction, while the smaller ends of the tapered elements 111 of the second sheet face the reverse direction.

Figure 19:
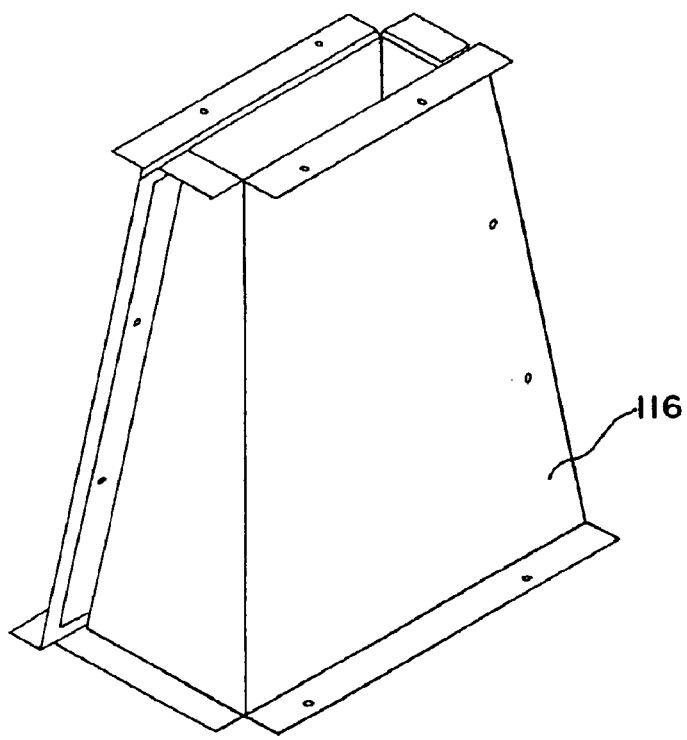
FIG. 19 is a perspective view of a polygonal tapered deformable element.
Figure 20:
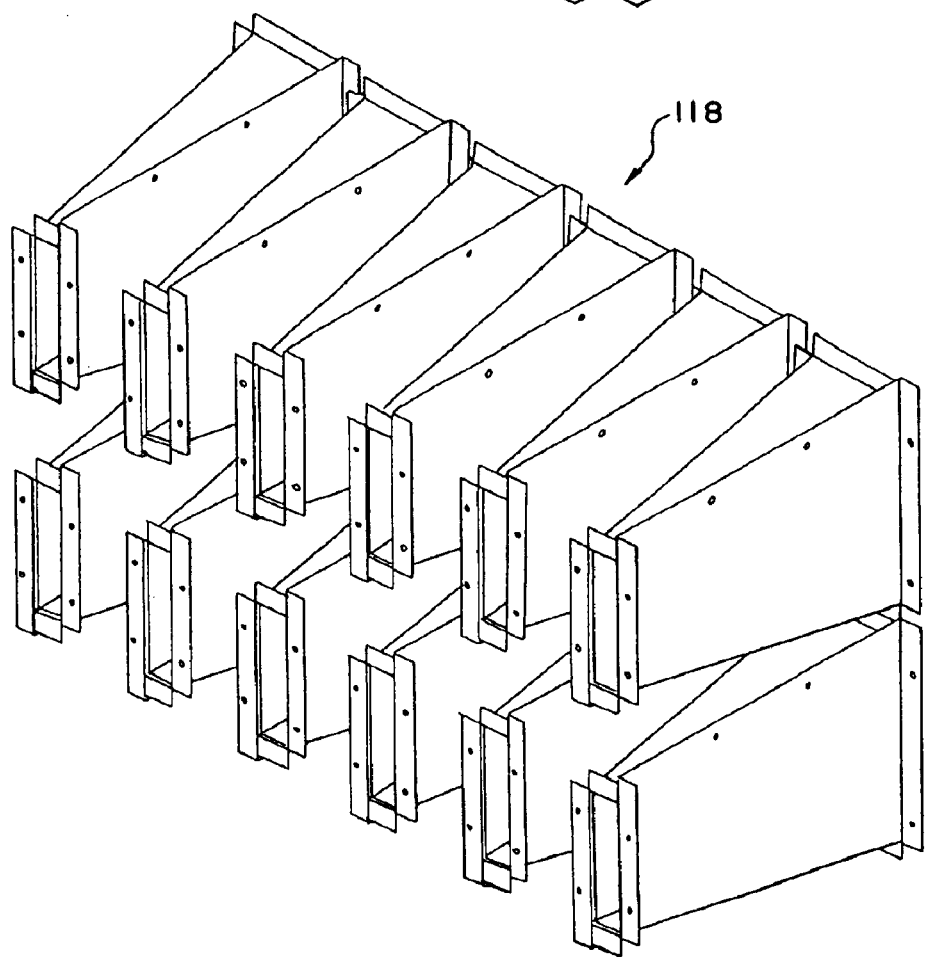
FIGS. 20 and 21 are perspective views of unidirectional and bi-directional arrays, respectively, using the polygonal deformable element of FIG. 19.
Figure 21:
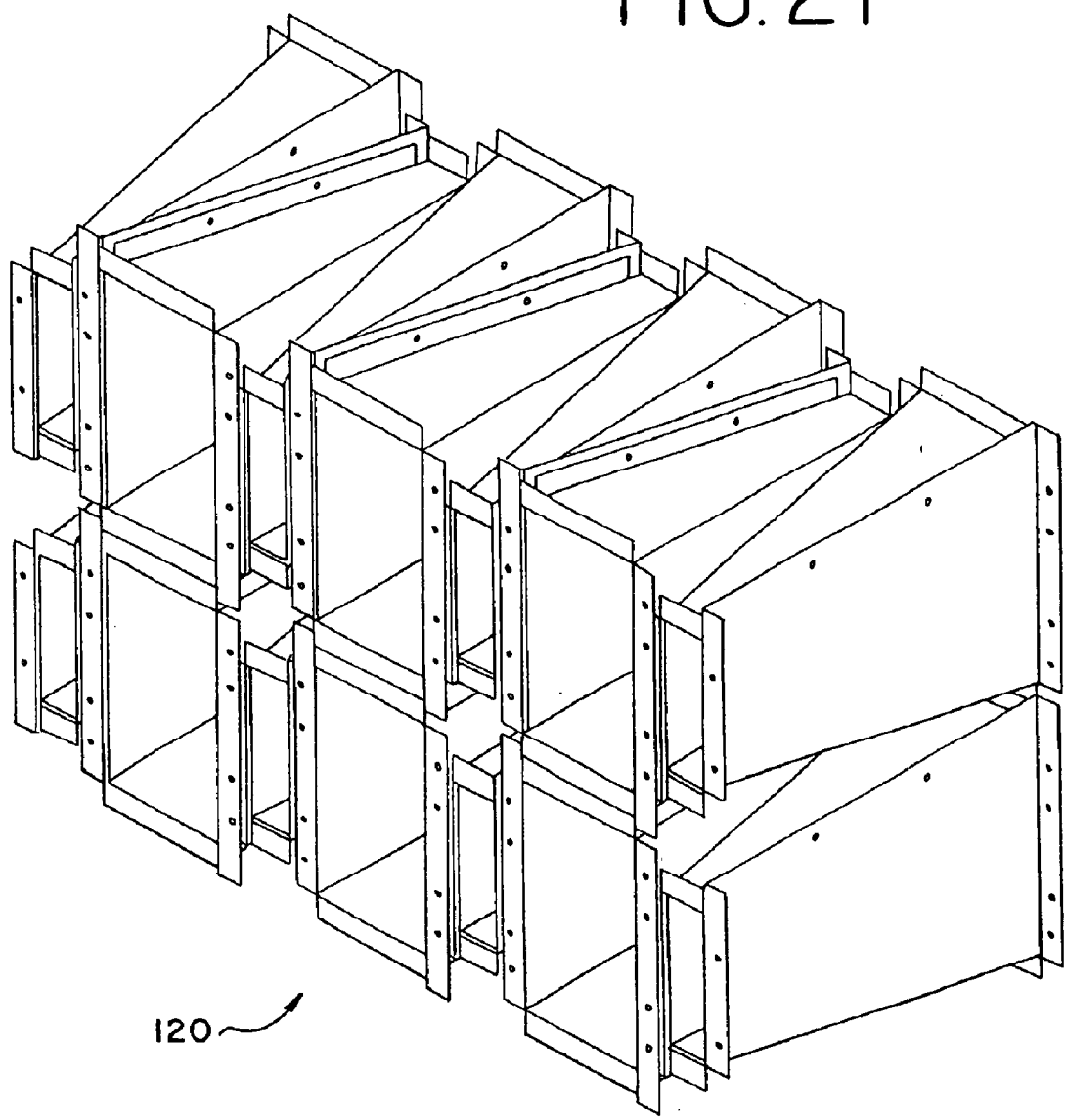

It is not essential in all embodiments that the tapered deformable elements be circular in cross section. As shown in FIGS. 19–21, various polygonal cross sectional shapes can be used. The tapered deformable element 116 of FIG. 19 has a rectangular cross sectional shape. Other polygonal shapes including polygons with more or fewer sides arranged as regular or irregular polygons can be used. As shown in FIGS. 20–21, polygonal tapered deformable elements 116 can be arranged in a uni-directional array 118 or a bidirectional array 120.

Though not shown in FIGS. 14–21, conventional cover plates can be used to house and secure the tapered deformable elements in place, if desired, and multiple rows of the illustrated elements can be used in a single energy absorbing element.

The tapered deformable elements provide the advantage of an increased stroke and thereby increased efficiency. This is because the tapered deformable elements 94, 111, 116 can be crushed to a small fraction of their original length before metal-to-metal contact of the crushed element provides substantial increases in the forces required for further crushing.

The crash cushion 10 reacts to the impact of a vehicle in the following way. First the impacting vehicle contacts the rear impact face 14. This face provides a uniform surface for the vehicle to interact with and transfers the loading from the vehicle to the crash cushion 10. The side frame elements 32 begin to flex because of this loading and then continue to flex until the restraints 46 fail. The amount of loading that is applied to an impacting vehicle can be tuned by taking into account the several factors that determine when the restraints release the respective hinges. These factors may include the geometry of the hinges 34 and the side frame elements 32 in relation to the location of the restraints 46, the ultimate strength of the bolts 48, the stiffness of the side frame elements, and the mass of the side frame elements, the transverse frames and the face 14.

Once the restraints 46 fail, the side frame elements 32 begin to rotate in response to the force supplied by the impacting vehicle to the transverse frame 20. The translation of transverse frame 20 and the rotation of the side frame elements 32 cause a transfer of kinetic energy that was originally in the impacting vehicle into the frame 12, thereby slowing the impacting vehicle. The side frame elements 32 continue to collapse until the gaps G1, G2 between the energy absorbing elements 16, 17 and the transverse frames 20, 22 have closed (FIG. 4). The energy absorbing elements 16, 17 are then deformed as they collapse until the design level of kinetic energy has been dissipated by the system or the vehicle has been brought to a stop.

The crash cushion 10 is designed so that under many impacts most of the components of the frame 12 are reusable. The energy absorbing elements 16, 17 are expendable and are intended to be replaced after an impact.

The initial decelerating forces applied by the crash cushion 10 to an impacting vehicle are determined as a function of (1) the linear inertia of the component elements of the frame 12 (e.g. the mass of the transverse frame 20), (2) the linear and rotational inertia of the side frame elements 32, and (3) the angular offset of each side frame element 32 with respect to the collapsing loads applied during an impact. Note that both the linear and the rotational inertial responses of the system do not involve any planned deflection of, tearing of, or other damage to the frame 12.

The initial impact response of the crash cushion 10 also depends on the use of mechanical or electromechanical restraints that limit release of the collapsible bays until some desired minimum threshold level of impact severity is achieved. The system described above is completely passive, and relies on the breaking of bolts placed in tension by the impact to control the release of the frame 12. Other passive means such as shear pins, breakaway cables, or high-friction brakes in each of the hinges 34 can also be used. Alternatively, restraints suitable for use with this invention may involve sensors and/or controls that adjust the properties of the release to best suit the particular characteristics of the impacting vehicle, after some determination is made about the conditions of the impact. For example, a restraint may include an electromechanical device. When a load (as measured by an integral load cell) reaches a threshold value, a locking pin may be pulled out of a joint by an actuator, thus releasing the hinge. Thus, the restraints that limit collapse of the frame may or may not be reusable and they may be passive or active. The key characteristic is that the collapse of the system is released under specific and predictable conditions, but not otherwise. Active restraints may allow collapse of the frame to be conditional on any desired combination of impact conditions such as force, velocity, and displacement.

By adjusting the inertial properties of the transverse frames 20, 22 and the side frame elements 32, by adjusting the geometry of the side frame elements 32 (i.e. the amount the side frame elements 32 are bent at their hinges 34 in their deployed, operational position), and by adjusting the characteristics of the restraints 46, the response of the crash cushion 10 can be tailored to optimally trigger onboard airbags or other onboard safety systems of an impacting vehicle. One particular challenge for airbags is the distinguishing of conditions requiring deployment of the airbag, for example a high-speed accident, from conditions under which the airbag is not required, for example a low speed bump into a parking bollard or another vehicle. By adjusting the response of the crash cushion, the problem of non-deployment, or inappropriate deployment of airbags can be reduced. For example, by adjusting crash cushion parameters to obtain a relatively high initial deceleration spike, the crash cushion 10 can provide an initial force on the impacting vehicle that is large enough and shaped to tend to ensure the deployment of an airbag early in the impact, thus maximizing the benefit of the airbag to the vehicle occupants.

The crash cushion 10 can also be designed to reduce the overall length of the crash cushion 10. It is generally true that the greater the length of a crash cushion, the lower the forces of impact will be. However, additional length limits the sites at which a particular crash cushion may be properly applied. In the application of a crash cushion mounted to the back of a truck, the length of the crash cushion is of particular sensitivity, in that additional length adds weight that must be supported by the frame of the truck. Further, the weight of the truck-mounted crash cushion is generally cantilever-mounted to the truck, so that additional length increases the moment of the weight of the crash cushion on the mounting structure 18. Also, as the length of a truck-mounted crash cushion increases, the rearmost end of the crash cushion will tend to swing widely as the truck turns. For these reasons, reducing the length of truck-mounted crash cushions is of particular benefit.

As the length of a crash cushion is reduced, it is important that the impact response of the crash cushion is very carefully designed so to continue to provide optimal safety performance. The ability of the designer to tune the response of the crash cushion allows this delicate balance between the system's length and its impact performance to be established.

Another advantage of the frame 12 is that it can be collapsed to a very compact size for shipping and storage. If the included energy absorbing elements 16, 17 are themselves collapsible (e.g. formed of hydraulic or pneumatic elements), then the frame 12 can be collapsed while mounted on the truck T so that the crash cushion 10 can be made very compact when the truck T is in transit.

Figure 12:
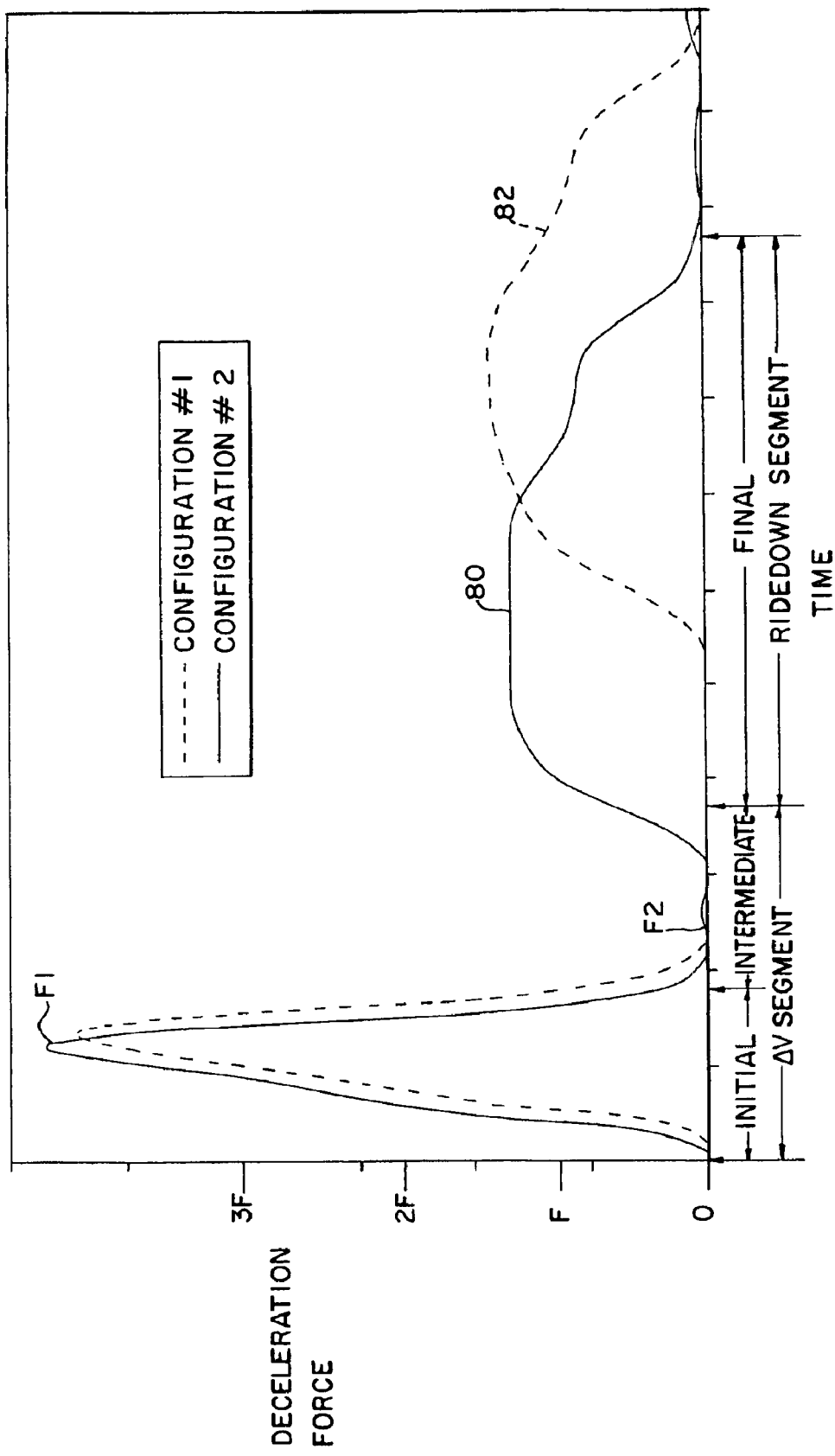
FIG. 12 is a graph of deceleration force versus time for two variants of the embodiment of FIG. 2 during comparable impact events.

Actual crash tests have shown that the crash cushion 10 can readily be tuned by adjusting the parameters described above to obtain a desired deceleration curve. FIG. 12 shows two curves 80, 82 of decelerating force versus time as an impacting vehicle strikes the crash cushion 10. The principal differences between the tests that resulted in the curves 80 and 82 relate to selected ones of the variables described above. For the curve 80, two energy absorbing elements 16, 17 were used, but the energy absorbing element 16, 17 in the first bay was shorter and less stiff than the energy absorbing element in the second bay. In particular, the gap G1 was 33 inches while the gap G2 was seven inches. The conditions used for the curve 82 included no energy absorbing element in the first bay and a gap of only one inch between the energy absorbing element of the second bay and the second transverse frame 22. Note that the curve 80 provides a second peak after the initial spike that occurs substantially earlier during the crash than the second peak in the curve 82. The magnitudes and locations in time of the peaks can be controlled by properly choosing the system parameters discussed above.

From the foregoing it should be apparent that an improved highway crash cushion has been described that lends itself to being tuned by the designer for particular impact characteristics. For the crash cushion 10, there are at least five variables that can be selected for each of the two bays: linear inertia, rotational inertia, stiffness of the energy absorbing element in the bay, gap between the energy absorbing element and the respective transverse frames, and release load of the restraints. Any of these variables can be set at different levels for the two bays. Furthermore, the two bays cooperate with one another in a complex way.

The preferred crash cushion of this invention arranges these variables to achieve a novel system response profile that meets currently-prevailing regulatory standards while providing a dramatically shortened crash cushion.

Impact testing of crash cushions is guided in North America by the National Cooperative Highway Research Program Report 350 (NCHRP-350). The NCHRP-350 guidelines rely on the flail space model for evaluation of occupant risk during an impact test. The flail space model assumes an unrestrained occupant in the front seat of the vehicle. At the beginning of the crash event, the vehicle is decelerated by the impact with the crash cushion, while the occupant continues forward in an unimpeded manner. At some point, the occupant makes contact with the inside of the vehicle, and the NCHRP-350 guidelines specify limits on the velocity of the occupant relative to the vehicle at the moment of contact. Once the occupant has come into contact with the vehicle interior, he or she is assumed to remain in contact with the vehicle as it is decelerated to a stop. The NCHRP-350 guidelines specify that while the occupant is in contact with the vehicle interior, the magnitude of deceleration of the vehicle must not exceed 20 G. These guidelines also specify that the occupant shall not come into contact with the vehicle at a relative speed greater than 12 meters per second.

For the purposes of this discussion, the portion of an impact event or crash up to the instant of occupant impact with the interior of the vehicle will be referred to as the delta-V segment or portion, and the remainder of the event (from occupant impact until the vehicle comes to rest) will be referred to as the ride-down segment.

The delta-V segment and the ride-down segment for one impact are shown in FIG. 12. The delta-V segment is divided into an initial portion and an intermediate portion, and the ride-down segment corresponds to the final portion of the impact event. These legends are relevant only to the curve 80. The curve 82 has been tuned for other characteristics and is not relevant in this discussion.

As shown in FIG. 12, the initial portion of the system response profile is characterized by a high peak deceleration, that is associated with a peak decelerating force exceeding 3F in this embodiment. The initial portion is followed by an intermediate portion in which vehicle deceleration falls. The intermediate portion is characterized by a substantial reduction in decelerating forces on the vehicle. In this case, the decelerating forces approximately reach zero.

Once the vehicle has been decelerated by the desired velocity (such as 12 meters per second), the crash cushion then provides a controlled deceleration below the regulatory limit of 20 G during the final portion. In the final portion the average decelerating force is at the level F shown in FIG. 12.

The curve 80 is provided by way of example. In general, it is preferred to apply high decelerating forces to the impacting vehicle that peak at F1 during the initial portion of the impact event. F1 is preferably at least about 150% of F, more preferably at least about 200% of F, and most preferably at least about 300% of F. This provides a sharp deceleration to the vehicle which contributes to a short stopping distance for the impact event. However, if the high peak deceleration of the initial portion of the impacting event were continued, the vehicle would be decelerated to such an extent that the occupant would strike the interior of the vehicle with an excessively high velocity. In order to prevent this undesired result, the intermediate portion of the impact event or the response profile falls to a decelerating force that is substantially less than F. Preferably, the decelerating force falls to a value F2 that is less than 50% of F, more preferably less than 20% of F, and most preferably less than 10% of F. The decelerating force preferably remains below this value for at least 20 mS, more preferably at least 30 mS, and most preferably at least 40 mS. The foregoing values are provided for force levels and time durations as independent parameters, and are not intended to indicate a preference for any specific combination of force level and time duration.

The inventors of the present invention have discovered that by taking the counterintuitive step of substantially reducing decelerating forces on the vehicle during the intermediate portion of the impact event, following the sharp peak in decelerating forces during the initial portion, the total elapsed time and the total elapsed distance of the impact event can be reduced. Because a short impact event is important for many applications, this represents a significant advance in the art.

Simply by way of example, significant system parameters associated with the system that produced the deceleration curve 80 of FIG. 12 are described in Table 2.

TABLE 1

Preferred Crash Cushion Parameters

A. Mass of Frame Elements

| | |
|---|---|
| transverse frame 20- | 129 kg |
| transverse frame 22- | 58 kg |
| side frame element 32- | 32 kg |

B. Moment of Inertia

| | |
|---|---|
| side frame element 32- | 1.92 kg-m.sup.2 |

C. Bolts 48

Hex bolt, 3/8", coarse thread, grade 8

D. Gaps

G1 = .229 m
G2 = .178 m

Number of cells
per row   Material thickness (mm)

E. Front Energy Absorbing Element 16

| | | |
|---|---|---|
| Row 1 (Front) | 4 | .81 |
| Row 2 | 4 | .81 |
| Row 3 | 8 | .81/1.02 (4 cells of each) |
| Row 4 | 8 | .81/1.02 (4 cells of each) |
| Row 5 (Rear) | 8 | 1.02 |

F. Rear Energy Absorbing Element 17

| | | |
|---|---|---|
| Row 1 (Front) | 8 | .81 |
| Row 2 | 12 | 1.27 |
| Row 3 | 12 | 1.27 |
| Row 4 | 12 | 1.27 |
| Row 5 (Rear) | 12 | .81/1.02 (6 cells of each) |

In the crash cushion of Table 1, the energy absorbing elements 16, 17 each include five rows of sheet aluminum cells. FIG. 13 shows a twelve cell row, and the other rows were similar, but with fewer cells per row where appropriate.

The crash cushions described above represent only one approach to achieving the desired system response profile. Many other approaches are possible. For example, a large inertial mass can be placed at a selected distance in front of a conventional crash cushion, such as the truck-mounted attenuator shown in FIG. 32 and described in U.S. Pat. No. 5,199,755, which is hereby incorporated herein by reference. The crash cushion 410 includes an energy absorbing element 412 made up of a front cartridge 414 and a rear cartridge 416. The rear cartridge 416 is secured to or includes the backup structure 220.

Figure 33:
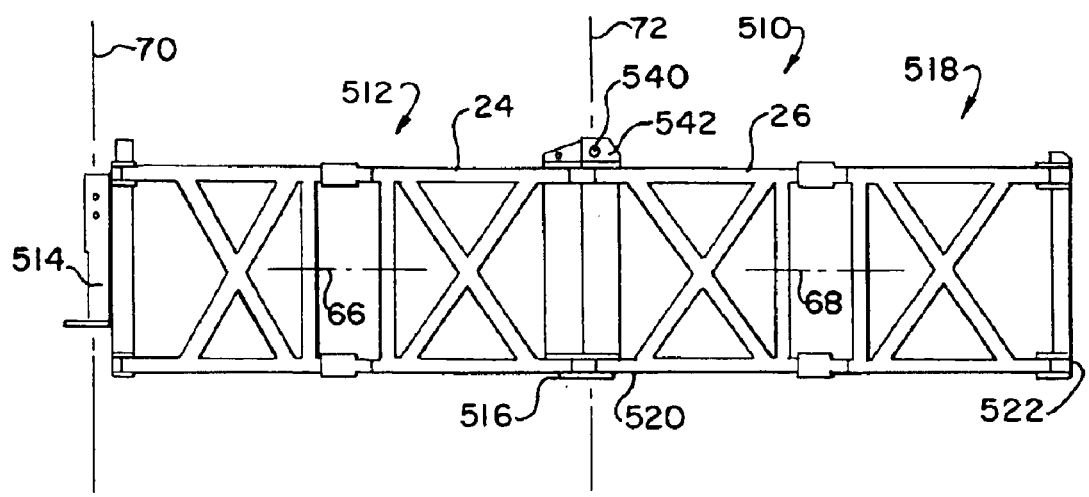
FIG. 33 is a side view of another alternative embodiment of a crash cushion.
Figure 34:
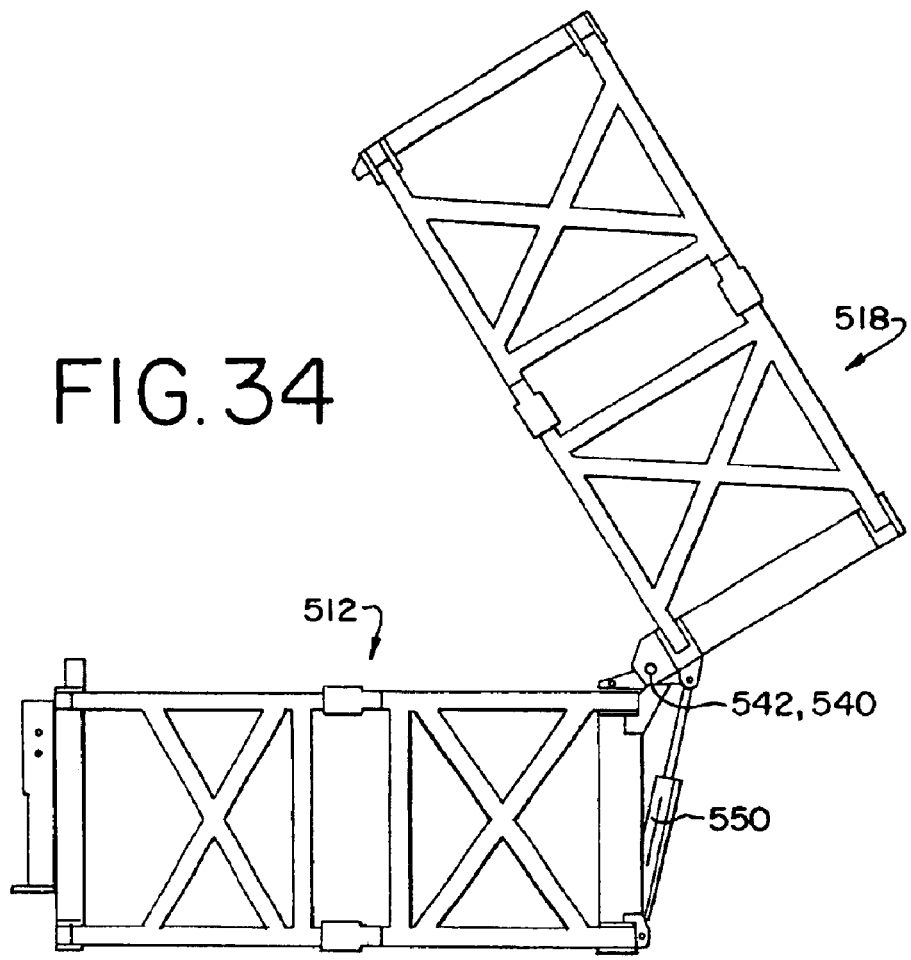
FIGS. 34 and 35 are side views of the crash cushion shown in FIG. 33 with a second bay thereof being progressively raised to a retracted position.
Figure 35:
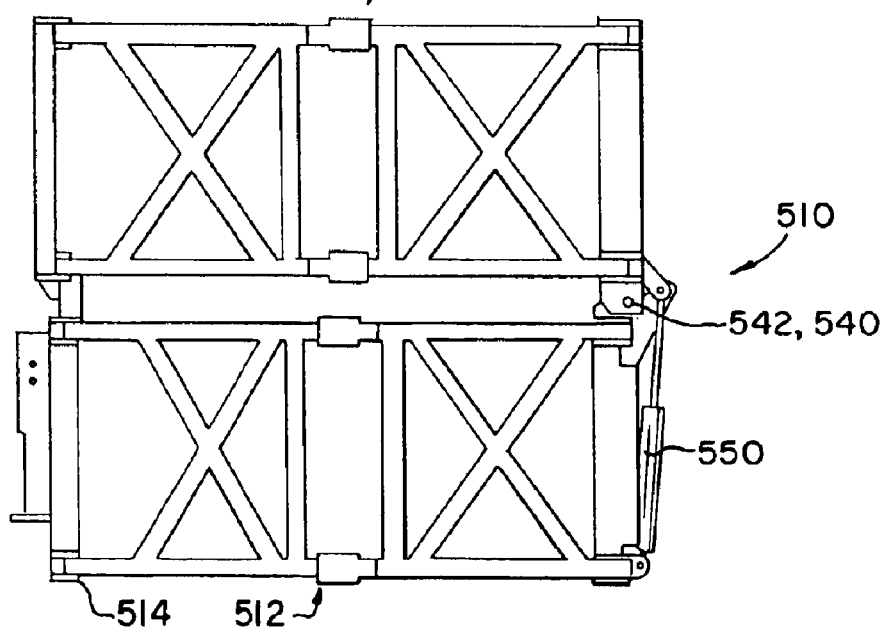

Referring to FIGS. 33–35, yet another embodiment of a crash cushion is shown as including a first bay 512 having a front end 514 and a back end 516, and a second bay 518 having a front end 520 and a back end 522. The first and second bays are pivotally connected at joint 540 about axis 542 and include an actuator 550 mounted between the bay and which rotates the second bay about the axis 542 such that the second bay overlies the first bay, whereby the length of the attenuator can be substantially reduced for transport.

Alternately, a brake-based crash cushion such as that described in U.S. Pat. No. 5,022,782 can be provided with an intermediate portion of the stroke in which the braking efficiency, and thereby the decelerating force, are substantially reduced. This can be done by properly adjusting the dimension, material or lubrication of the brake cable. As yet another example, the high peak deceleration during the initial portion of the impact event can be provided by a pneumatic or hydraulic energy absorbing system that is followed after a specified gap by a second, less stiff energy absorbing system.

In a further example of such a system provided with a pneumatic or hydraulic energy absorbing system, the energy absorbing means can be valved to provide an initial force peak, followed by a dramatic reduction in resistive force, then finally followed by a second, lower resistive force. More specifically, the initial peak force can be provided by a pre-pressurized pneumatic element, for example a gas-containing bag, with the pneumatic element allowed to rapidly vent immediately after that initial peak force so that the resistive force of the crash cushion falls dramatically during the intermediate segment of the crash event, after which the gas-containing bag can be explosively re-pressurized to provide the necessary resistive force during the final segment of the crash event. Another approach is to use a stiff crushable element to provide the ideal response profile. A mechanical release, as disclosed by June U.S. Pat. No. 5,642,792 would then release after a specified amount of crush had taken place.

Another approach to generating the desired system response profile is to support the impact face of the crash cushion with a sacrificial mechanical support that provides the needed initial peak force but is then completely crushed or shattered so that its resistance drops to near zero for the intermediate segment of the crash event, after which the impacting vehicle engages a more conventional crash element for the final segment of the crash event. The crushable element can be replaced by elements that are extruded, split, curled, kinked, or otherwise mechanically deformed.

A suitable crash cushion can also be made with bays that collapse via sliding elements instead of or in addition to some of the hinged elements of the crash cushion 10.

In general, the widest variety of energy absorbing systems can be used to provide the desired system response profile, and different energy absorbing technologies can be used to achieve different portions of the system response profile. The widest possible range of material bending, material tearing, material crushing, material shattering, friction, hydraulic, pneumatic, and inertial systems can be used either alone or in various combinations to achieve the response profile discussed above.

Various embodiments of crash cushions are further disclosed and described in U.S. Pat. Nos. 6,481,920, 6,244,637, 6,092,959, 5,947,452, 5,642,792, 5,248,129, 5,199,755, 4,711,481 and 4,635,981, and in U.S. patent applications Ser. No. 10/002,833, filed Nov. 1, 2001 and Ser. No. 10/025,025, filed Dec. 19, 2001, the entire disclosures of which are hereby incorporated herein by reference.

Of course, many changes and modifications can be made to the preferred embodiments described above. For example, the frame can be made in whole or in part of solid panels as opposed to the illustrated construction. Similarly, the transverse frames can include solid panels and may differ from one another in thickness and in mass. If desired, the folding sides of the frame may be positioned at the top and the bottom of the crash cushion instead of on the lateral sides. Living hinges can be substituted for the multiple-component hinges illustrated, and as described above many alternatives are available for the restraints. Any suitable energy absorbing element technology can be adapted for use with this invention, including hydraulic, pneumatic, material-deforming, tearing, or pulverizing and other approaches. Both passive and active systems may be employed. By "active" is meant systems in which sensors provide information to the crash cushion which is in some manner evaluated and used to alter the performance of the crash cushion prior to and/or during the impact. Furthermore, it is not essential that each energy absorbing element be confined to a single bay. If desired, the transverse frames can define central openings that allow a single energy absorbing element to occupy space in two or more bays. This invention is not limited to use in truck mounted attenuators, but can also be used in front of other roadside obstructions, including fixed roadside obstructions such as bridge piers for example. Also, more than two bays may be used if desired.

As used herein the term "conical" is intended broadly to include frusto-conical shapes and the term "storage" is intended broadly to include transport as well as storage. The term "cable" is intended broadly to cover tension members generally, including chains, wire ropes, ropes, and the like.

The foregoing detailed description has described only a few of the many forms that this invention can take. For this reason, this detailed description is intended by way of illustration and not by way of limitation. It is only the following claims, including all equivalents, that are intended to define the scope of this invention.

What is claimed is:

1. A truck mounted attenuator comprising:
an interface structure comprising a pivot mount at a first location and a bearing surface at a second location vertically spaced from said first location, wherein said pivot mount is adapted to be pivotally mounted to a pivotable truck component and said bearing surface is adapted to slidably engage an understructure of the truck;
a backup structure pivotally mounted to said interface structure at a third location and engaged with said interface structure at a fourth location spaced from said third location; and
a crash cushion supported at least in part by said backup structure.

2. The truck mounted attenuator of claim 1 wherein said backup structure is releasably abuttingly engaged with said interface structure at said fourth location, wherein said backup structure is pivotally mounted to said interface structure at a horizontal pivot axis at said third location, wherein said backup structure and said crash cushion are pivotable about said horizontal pivot axis between at least a first position and a second position, wherein said backup structure is engaged with said interface structure at said fourth location when said backup structure and said crash cushion are in said first position and wherein said backup structure is disengaged with said interface structure at said fourth location when said backup structure and said crash cushion are in said second position.

3. The truck mounted attenuator of claim 1 further comprising a shim mounted to one of said backup structure and said interface structure at said fourth location and engaged with the other of said backup structure and said interface structure.

4. The truck mounted attenuator of claim 1 wherein said interface structure comprises a plurality of vertically spaced third locations, wherein said backup structure is releasably, pivotally mounted to said interface structure at one of said plurality of third locations.

5. The truck mounted attenuator of claim 1 wherein said interface structure comprises first and second horizontally spaced and vertically extending uprights, and wherein said pivot mount and said bearing surface comprise at least a first and second pivot mount and at least a first and second bearing surface formed on said first and second uprights respectively.

6. The truck mounted attenuator of claim 1 wherein said pivot mount has an elongated, vertically extending slot.

7. The truck mounted attenuator of claim 1 wherein said pivot mount has an opening with an upper portion having a bearing surface and enlarged lower portion.

8. The truck mounted attenuator of claim 1 wherein said interface structure comprises a yoke defining said pivot mount.

9. The truck mounted attenuator of claim 1 wherein said bearing surface is an outwardly curved surface.

10. A truck outfitted with an impact attenuator comprising:
said truck having an understructure and a pivotable element pivotally mounted to said understructure, wherein said pivotable element comprises a support frame and a bed supported on said support frame;
an interface element pivotally mounted to said support frame of said pivotable element and having a bearing surface bearing against said understructure; and
a crash cushion supported at least in part by said interface element.

11. The truck of claim 10 wherein said understructure comprises a plate, wherein said interface element bears against said plate.

12. The truck of claim 10 wherein said interface element is pivotally mounted to said support frame of said pivotable element with at least one pivot pin.

13. The truck of claim 12 wherein said interface element has a vertically oriented slot engaging said at least one pivot pin.

14. The truck of claim 12 wherein said interface element has an opening having an upper portion having a bearing surface engaging said at least one pivot pin and an enlarged lower portion.

15. The truck of claim 10 wherein said interface element comprises first and second horizontally spaced and vertically extending uprights each pivotally mounted to said support frame of said pivotable element.

16. The truck of claim 10 wherein said interface element comprises a yoke, wherein a portion of said support frame is received in and pivotally mounted to said yoke.

17. The truck of claim 10 further comprising a backup structure pivotally mounted to said interface element at a first location and engaged with said interface element at a second location spaced from said first location, and wherein said crash cushion is supported at least in part by said backup structure.

18. The truck of claim 17 wherein said backup structure is releasably abuttingly engaged with said interface element at said second location, wherein said backup structure is pivotally mounted to said interface element at a horizontal pivot axis at said first location, wherein said backup structure and said crash cushion are pivotable about said horizontal pivot axis between at least a first position and a second position, wherein said backup structure is engaged with said interface element at said second location when said backup structure and said crash cushion are in said first position and wherein said backup structure is disengaged with said interface element at said second location when said backup structure and said crash cushion are in said second position.

19. The truck of claim 17 further comprising a shim mounted to one of said backup structure and said interface element at said second location, wherein said shim is engaged with the other of said backup structure and said interface element.

20. The truck of claim 17 wherein said interface structure comprises a plurality of vertically spaced first locations, wherein said backup structure is releasably, pivotally mounted to said interface element at one of said plurality of first locations.

21. The truck of claim 10 wherein said bearing surface is an outwardly curved surface.

22. A method for mounting a truck mounted attenuator to a truck:
    resting said attenuator on the ground, wherein said attenuator comprises an interface element and a crash cushion supported at least in part by said interface element;
    pivoting a pivotable element of said truck from a substantially horizontal position to a tilted position, wherein said pivotable element comprises a support frame and a bed supported on said support frame;
    pivotally connecting said interface element to said support frame of said truck while said pivotable element is in said tilted position; and
    pivoting said pivotable element from said tilted position to said substantially horizontal position and thereby lifting said attenuator off of the ground to a deployed position.

23. The method of claim 22 wherein said interface element is pivotally connected to said support frame at a pivot axis, and further comprising sliding said interface element against said understructure at a location spaced from said pivot axis while pivoting said pivotable element from said tilt position to said substantially horizontal position.

24. The method of claim 23 wherein said understructure comprises a plate, wherein said sliding said interface element against said understructure comprises bearing said interface element against said plate.

25. The method of claim 24 wherein said bearing said interface element against said plate comprises bearing an outwardly curved bearing surface against said plate.

26. The method of claim 23 wherein said interface element is pivotally mounted to said support frame at said pivot axis with at least one pivot pin.

27. The method of claim 26 wherein said interface element has a vertically oriented slot engaging said at least one pivot pin.

28. The method of claim 26 wherein said interface element has an opening having an upper portion with a bearing surface engaging said at least one pivot pin and an enlarged lower portion.

29. The method of claim 22 wherein said interface element comprises first and second horizontally spaced and vertically extending uprights each pivotally mounted to said support frame of said pivotable element.

30. The method of claim 22 wherein said interface element comprises a yoke, wherein said pivotally connecting interface element to said support frame comprises inserting a portion of said support frame into said yoke.

31. The method of claim 22 further comprising pivotally mounting a backup structure to said interface element at a pivot axis and engaging said interface element at location spaced from said pivot axis, and wherein said crash cushion is supported at least in part by said backup structure.

32. The method of claim 31 wherein said backup structure is releasably abuttingly engaged with said interface element at said location.

33. The method of claim 32 further comprising a shim mounted to one of said backup structure and said interface element and releasably abuttingly engaging the other of said backup structure and said interface element at said location.

34. The method of claim 31 wherein said interface element comprises a plurality of vertically spaced pivot axes, wherein said backup structure is releasably, pivotally mounted to said interface element at one of said plurality of pivot axes.

35. A method for mounting a truck mounted attenuator to a truck:
    resting said attenuator on the ground, wherein said attenuator comprises a crash cushion;
    connecting said crash cushion to an interface element;
    pivoting a pivotable element of said truck from a substantially horizontal position to a tilted position, wherein said pivotable element comprises a support frame and a bed supported on said support frame;
    pivotally connecting said interface element to said support frame of said truck; and
    pivoting said pivotable element from said tilted position to said substantially horizontal position and thereby lifting said attenuator off of the ground to a deployed position.

* * * * *